United States Patent
Dempsey et al.

(10) Patent No.: US 9,725,091 B2
(45) Date of Patent: Aug. 8, 2017

(54) VEHICLE SPEED MANAGEMENT INTEGRATED WITH VEHICLE MONITORING SYSTEM

(71) Applicant: Cummins, Inc., Columbus, IN (US)

(72) Inventors: Daniel Reed Dempsey, Columbus, IN (US); Kenneth Follen, Greenwood, IN (US); Vivek A. Sujan, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 14/790,739

(22) Filed: Jul. 2, 2015

(65) Prior Publication Data
US 2017/0001639 A1    Jan. 5, 2017

(51) Int. Cl.
| | |
|---|---|
| B60W 30/16 | (2012.01) |
| G01C 21/26 | (2006.01) |
| B60W 30/14 | (2006.01) |
| G08G 1/16 | (2006.01) |

(52) U.S. Cl.
CPC .......... B60W 30/146 (2013.01); G08G 1/16 (2013.01); *B60W 2300/12* (2013.01); *B60W 2520/10* (2013.01); *B60W 2530/16* (2013.01); *B60W 2540/30* (2013.01); *B60W 2550/14* (2013.01); *B60W 2550/308* (2013.01); *B60W 2720/10* (2013.01); *G01C 21/26* (2013.01)

(58) Field of Classification Search
CPC .... B60W 30/16; B60W 40/08; F16H 61/0213
USPC ........................ 701/96, 51, 55, 56
See application file for complete search history.

(56) References Cited

U.S. PATENT DOCUMENTS

| | | | | |
|---|---|---|---|---|
| 5,898,282 | A * | 4/1999 | Drozdz ................. | B60L 11/123 180/65.235 |
| 6,819,283 | B2 * | 11/2004 | Okai .................... | G01S 7/40 342/114 |
| 8,014,928 | B2 * | 9/2011 | Mills ................... | B60W 30/16 701/300 |

(Continued)

FOREIGN PATENT DOCUMENTS

| | | |
|---|---|---|
| EP | 1 363 800 | 11/2003 |
| EP | 1 369 287 | 12/2003 |
| JP | 07-200991 | 8/1995 |

OTHER PUBLICATIONS

United States Department of Energy, "Technology Roadmap for the 21st Century Truck Program", Dec. 2000, 196 pages.

*Primary Examiner* — Thomas G Black
*Assistant Examiner* — Wae Louie
(74) *Attorney, Agent, or Firm* — Foley & Lardner LLP

(57) ABSTRACT

Systems, apparatuses, and methods herein relate to vehicle speed management. The apparatus includes a projection module structured to determine a future road load for a vehicle based on horizon data regarding an attribute of a route of the vehicle at a future location of the vehicle. The apparatus also includes a vehicle drafting module structured to determine a drafting road load for the vehicle based on drafting data regarding operation of a second vehicle. The apparatus further includes a vehicle speed management module structured to determine and provide a vehicle speed adjustment to an output device of the vehicle to at least one of facilitate and maintain a drafting arrangement between the vehicle and the second vehicle responsive to at least one of the future road load and the drafting road load.

23 Claims, 9 Drawing Sheets

(56) References Cited

U.S. PATENT DOCUMENTS

| | | | | |
|---|---|---|---|---|
| 8,100,426 B2* | 1/2012 | Kronenberg | ............ | B60D 1/58 |
| | | | | 180/14.1 |
| 8,180,297 B2* | 5/2012 | Hesse | ................ | H04L 63/0823 |
| | | | | 455/41.3 |
| 8,332,108 B2* | 12/2012 | Kresse | ............... | F16H 61/0213 |
| | | | | 477/900 |
| 8,452,509 B2* | 5/2013 | Sujan | ................ | G01C 21/3469 |
| | | | | 180/165 |
| 2010/0256836 A1* | 10/2010 | Mudalige | ............... | G08G 1/163 |
| | | | | 701/2 |
| 2011/0098922 A1* | 4/2011 | Ibrahim | ............... | B60W 40/08 |
| | | | | 701/532 |
| 2012/0197500 A1* | 8/2012 | Sujan | ............... | B60W 50/0097 |
| | | | | 701/51 |
| 2014/0109868 A1* | 4/2014 | Zhu | .................... | F02D 41/0072 |
| | | | | 123/349 |
| 2015/0345622 A1* | 12/2015 | Sujan | ................. | F16H 61/0213 |
| | | | | 701/55 |
| 2016/0054736 A1* | 2/2016 | Kolhouse | .............. | G08G 1/017 |
| | | | | 701/96 |

* cited by examiner

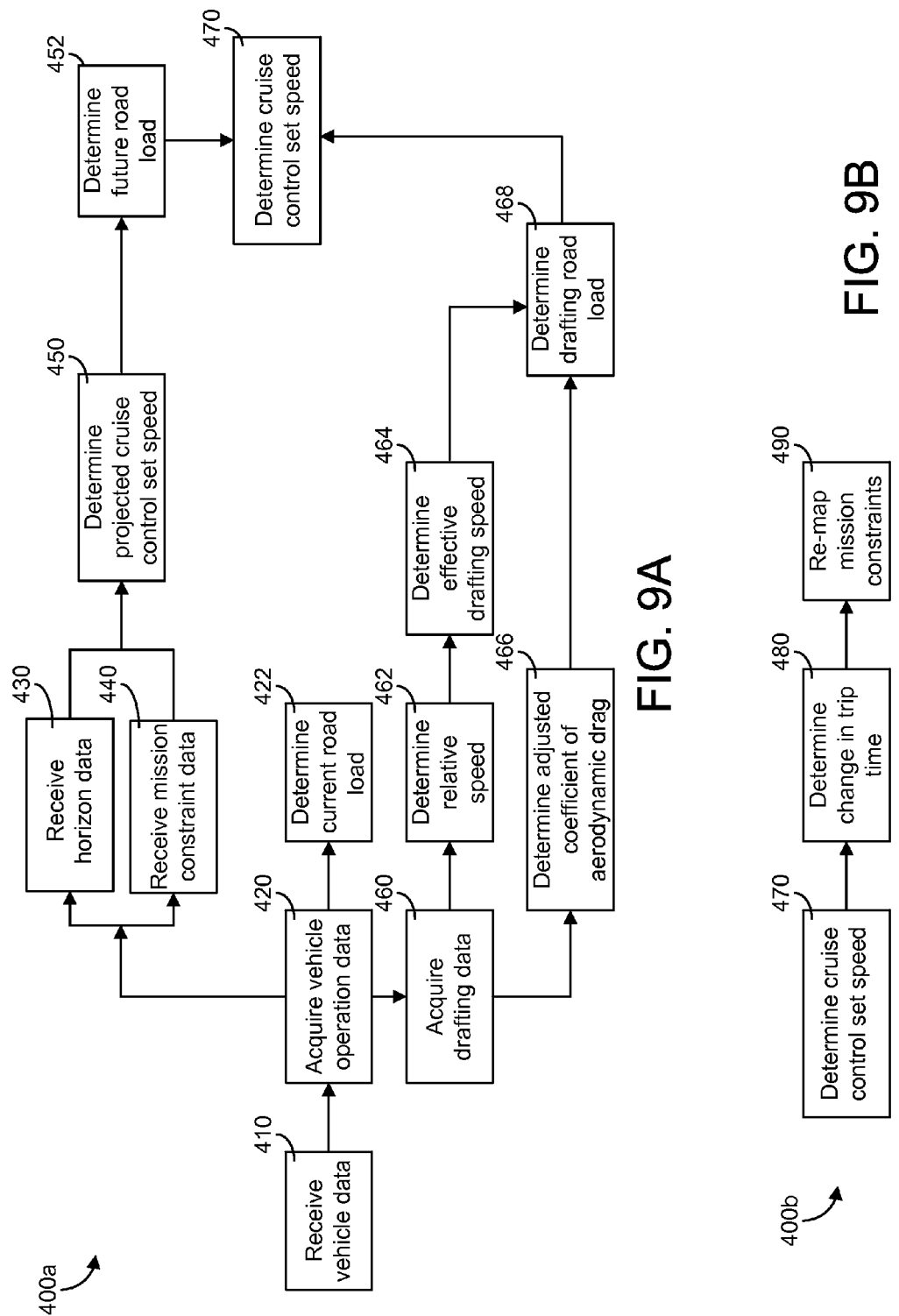

VEHICLE SPEED MANAGEMENT INTEGRATED WITH VEHICLE MONITORING SYSTEM

BACKGROUND

Today, many vehicles include a cruise control operating mode. Cruise control enables the vehicle to operate at or near a set speed without operator input (e.g., depression of the accelerator pedal). For example, during highway or freeway driving, an operator may set a cruise control speed near the posted speed limit. At which point, the operator need not control the accelerator pedal to control the vehicle's speed. By relieving operator control of the vehicle's speed, inconsistent and transient acceleration/deceleration events are reduced, which consequently reduces the acceleration/deceleration spikes that cause unsmooth vehicle operation. As such, cruise control operating mode provides for a relatively smoother vehicle operation.

SUMMARY

One embodiment relates to an apparatus. The apparatus includes an operator interface module, a load determination module, a projection module, a vehicle drafting module, and a vehicle speed management module. The operator interface module is structured to receive an input, the input including a cruise control operating mode initiation and a cruise control set speed for a vehicle. The load determination module is structured to determine a current road load for the vehicle based on vehicle operation data regarding a characteristic of operation of the vehicle. The projection module is structured to determine a future road load for the vehicle based on horizon data regarding an attribute of a route of the vehicle at a future location of the vehicle. The vehicle drafting module is structured to determine a drafting road load for the vehicle based on drafting data regarding operation of a second vehicle. The vehicle speed management module is structured to determine and provide a vehicle speed adjustment to an output device of the vehicle to at least one of facilitate and maintain a drafting arrangement between the vehicle and the second vehicle responsive to at least one of the future road load and the drafting road load.

Another embodiment relates to a method. The method includes receiving, by a controller, an indication of an initiation of a cruise control operating mode for a vehicle including a cruise control set speed; receiving, by the controller, vehicle operation data regarding a characteristic of operation of the vehicle; determining, by the controller, a current road load based on the vehicle operation data; receiving, by the controller, horizon data regarding an attribute of a route of the vehicle at a future location of the vehicle; determining, by the controller, a future road load based on the horizon data; receiving, by the controller, drafting data regarding operation of a second vehicle; determining, by the controller, a drafting road load based on the drafting data; and adjusting, by the controller, the cruise control set speed of the vehicle to at least one of facilitate and maintain a drafting arrangement between the vehicle and the second vehicle responsive to at least one of the current road load, the future road load, and the drafting road load.

Yet another embodiment relates to a method. The method includes receiving, by a controller, horizon data regarding a future location of a vehicle; determining, by the controller, a future road load based on the horizon data; receiving, by the controller, drafting data regarding operation of a second vehicle; determining, by the controller, a drafting road load for the vehicle based on the drafting data; and selectively providing, by the controller, a vehicle speed adjustment to an output device of the vehicle to at least one of facilitate and maintain a drafting arrangement between the vehicle and the second vehicle responsive to at least one of the future road load and the drafting road load.

Another embodiment relates to a vehicle. The vehicle includes a vehicle monitoring system structured to acquire drafting data regarding a drafting arrangement between the vehicle and a second vehicle, a route management system structured to receive horizon data regarding an attribute of a route of the vehicle at a future location of the vehicle, and a controller communicably coupled to the vehicle monitoring system and the route management system. The controller structured to receive vehicle operation data regarding a characteristic of operation of the vehicle, determine a current road load based on the vehicle operation data, determine a future road load based on the horizon data, determine a drafting road load based on the drafting data, and adjust a cruise control set speed of the vehicle to at least one of facilitate and maintain the drafting arrangement between the vehicle and the second vehicle responsive to at least one of the current road load, the future road load, and the drafting road load.

Still another embodiment relates to a vehicle. The vehicle includes a vehicle monitoring system structured to acquire drafting data regarding a drafting arrangement between the vehicle and a second vehicle. The vehicle also includes a route management system structured to receive horizon data regarding a future location of the vehicle. The vehicle further includes a controller communicably coupled to the vehicle monitoring system and the route management system. In one embodiment, the controller is structured to: determine a future road load based on the horizon data; determine a drafting road load based on the drafting data; and provide a vehicle speed adjustment to an output device of the vehicle to at least one of facilitate and maintain a drafting arrangement between the vehicle and the second vehicle responsive to at least one of the future road load and the drafting road load.

These and other features, together with the organization and manner of operation thereof, will become apparent from the following detailed description when taken in conjunction with the accompanying drawings.

BRIEF DESCRIPTION OF THE DRAWINGS

FIG. 9A is a method of controlling a cruise control set speed, according to another example embodiment.

FIG. 9B is a method of controlling a cruise control set speed, according to still another example embodiment.

DETAILED DESCRIPTION

Figure 1:
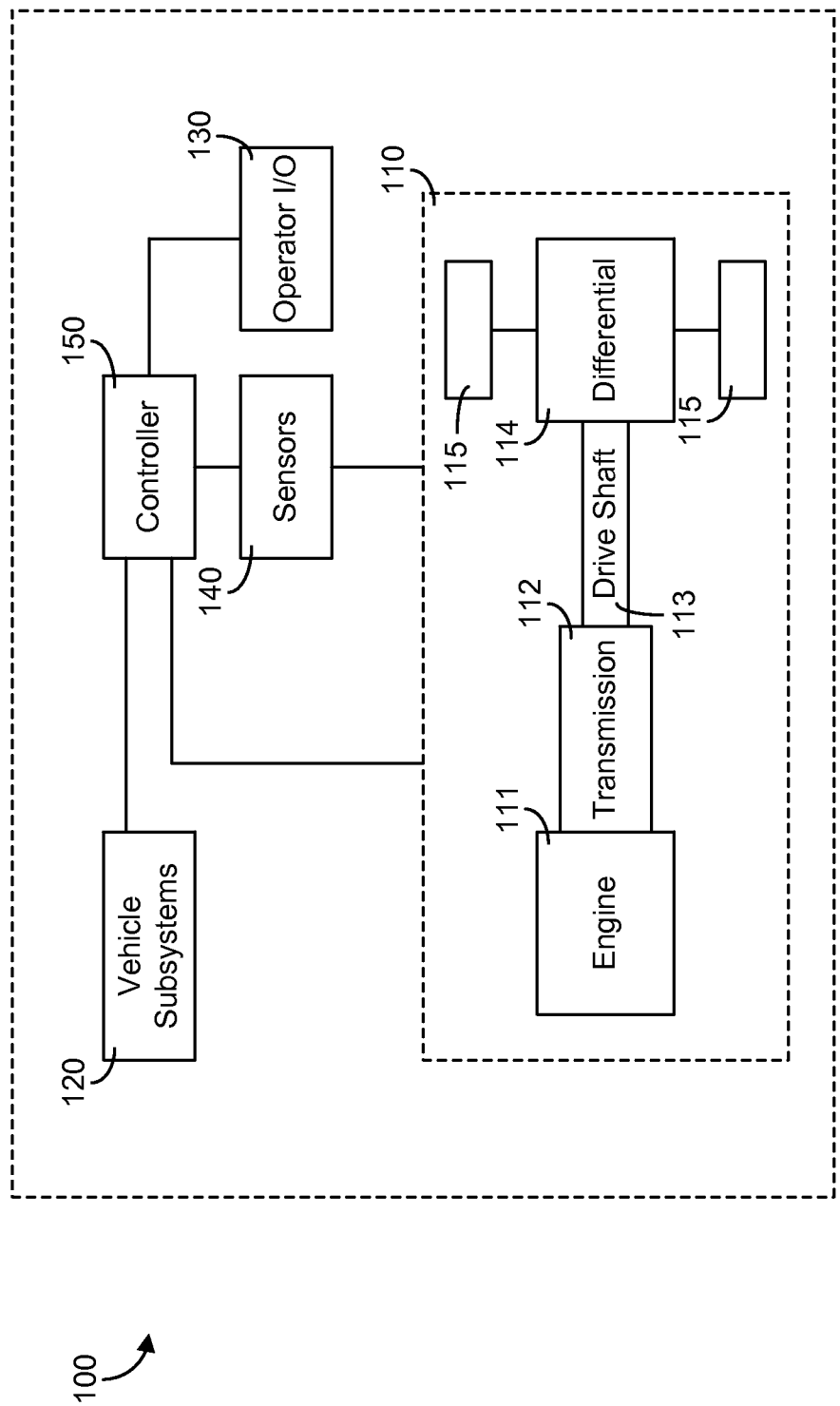
FIG. 1 is a schematic diagram of a vehicle with a controller, according to an example embodiment.

Following below are more detailed descriptions of various concepts related to, and implementations of, methods, apparatuses, and systems for controlling a cruise control set speed. The various concepts introduced above and discussed in greater detail below may be implemented in any of numerous ways, as the described concepts are not limited to any particular manner of implementation. Examples of specific implementations and applications are provided primarily for illustrative purposes.

Referring to the Figures generally, the various embodiments disclosed herein relate to systems and methods relating to the structure and functionality of integrated vehicle speed management and vehicle monitoring systems. Vehicle speed management systems manipulate the speed of a vehicle to reduce fuel consumption over a mission (e.g., trip, travel route, etc.). Vehicle monitoring systems monitor the surroundings of a vehicle to substantially prevent the vehicle from getting too close or colliding with another vehicle. By integrating the two systems together and as described herein, the vehicle speed management system of the present disclosure improves the overall operational characteristics of a vehicle, particularly during a cruise control operating mode.

Typically, vehicle speed management systems adjust a cruise control set speed based on the current loading on the vehicle (e.g., increase speed when loading increases to maintain speed, etc.). According to the present disclosure, a controller considers aerodynamic loading from a drafting or potential drafting arrangement, not just the current road load. In some situations, a drafting arrangement between vehicles may reduce aerodynamic loading on the vehicle and, consequently, increase fuel efficiency for the vehicle. Accordingly, the present disclosure provides for systems and methods of facilitating a drafting arrangement responsive to a determined drafting road load and, for example, the current road load and/or a future road load of the vehicle. For example, if the drafting road load is less than the determined current road load, the controller may provide a notification to an operator of the vehicle to engage in the drafting arrangement. In another example, the controller may increase or decrease the cruise control set speed to maintain the drafting arrangement if the drafting road load is determined to be less than the current road load. Thus, the systems, methods, and apparatuses of the present disclosure may provide for automatic or partially automatic speed adjustment as in the cruise control embodiment and/or operator-implemented speed adjustment as in the vehicle speed adjustment being provided to an output device of the vehicle for the operator to implement.

As briefly alluded to above, in another aspect of the present disclosure, the vehicle speed management system utilizes horizon data regarding attributes of a road at a future location (e.g., grade, etc.) to selectively adjust a cruise control set speed based on the current road load, the drafting road load, and the determined future road load to improve efficiency, as well as meet one or more operator defined preferences (e.g., a maximum/minimum vehicle speed excursion, etc.). Typically, vehicle speed management systems will allow the vehicle to decrease speed during an uphill grade and increase speed during a downhill grade (relative to the cruise control set speed) in order to increase fuel efficiency. According to the present disclosure, the controller may cause the exact opposite operation—increase speed on an uphill and decrease speed on a downhill—responsive to the determined current road load, drafting road load, and future road load. For example, if the controller determines that the drafting road load is less than the current and future road loads on an uphill grade, the controller may provide a command to maintain the drafting arrangement. To maintain the drafting arrangement, the cruise control set speed may be increased on the uphill grade (rather than decreased as in conventional systems). In this regard, the controller selectively adjusts the operating speed of the vehicle via the cruise control set speed to achieve or substantially achieve the lowest load condition to thereby reduce fuel consumption.

An example operation of the controller may be as follows. An operator initiates cruise control with the vehicle. The controller receives vehicle operation data including, but not limited to, engine speed and torque data to determine a current road load for the vehicle while in cruise control. The controller receives drafting data (e.g., via a vehicle monitoring system, etc.) including, but not limited to, a type of vehicle, a size of the vehicle, wind conditions/speed, a distance between the two vehicles and determines an effective aerodynamic drag, a minimum and maximum drafting speed, a minimum and maximum drafting distance (e.g., an optimal draft zone, etc.), and a drafting road load based on the drafting data. The controller receives horizon data (e.g., via a route management system, etc.) including, but not limited to, a road grade, a road curvature, and a road type and determines a future road load based on the horizon data. The controller receives mission constraint data (e.g., via an operator input/output device, etc.) including, but not limited to, a time constraint, a speed constraint (e.g., a maximum vehicle speed excursion/reduction relative to the cruise control set speed, etc.), a performance mode, and an efficiency mode. The controller interprets the foregoing data and determines a cruise control set speed to satisfy the mission constraints (e.g., arrival time, optimize fuel efficiency, etc.) based on road loads defined by the road attributes and the vehicle drafting. These and other example configurations are explained more fully herein.

Advantageously, the present disclosure provides for improved cruise control operating systems relative to conventional systems. Technically, the structure and functionality described herein improve the operation of a conventional controller for a vehicle by, among other features, integrating systems that are typically separate and using the inputs and outputs of those systems in a manner to improve the overall operation of the vehicle. Furthermore, the controller of the present disclosure provides for modularity to current cruise control systems due to vehicle speed management and vehicle monitoring systems already being included on many vehicles. This may be appealing to consumers who need not by expensive additional instrumentation. However, it should be understood that the systems and methods described herein are also applicable to non-cruise control operating modes, where the controller may utilize a determined drafting road load in combination with a current road load or a future road to provide a vehicle speed adjustment to an operator of the vehicle for implementation. These and other advantages and features of the present disclosure are described more fully herein below.

Referring now to FIG. 1, a schematic diagram of a vehicle 100 with a controller 150 is shown, according to an example embodiment. The vehicle 100 may be an on-road or an off-road vehicle including, but not limited to, line-haul trucks, mid-range trucks (e.g., pick-up truck), sedans, coupes, compacts, sport utility vehicles, and any other type of vehicle that utilizes cruise control systems. Although FIG. 1 depicts the vehicle 100 as including an internal combustion engine 111, the vehicle 100 may be powered by any type of engine system. For example, the vehicle 100 may be a hybrid vehicle, a full electric vehicle, and/or an internal combustion engine powered vehicle as shown.

As shown in FIG. 1, the vehicle 100 generally includes a powertrain system 110, vehicle subsystems 120, an operator input/output (I/O) device 130, and sensors 140 that are all communicably coupled to the controller 150. Communication between and among the components of the vehicle 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive/interpret data from one or more of the components shown in FIG. 1. For example, the data may include road data (e.g., road grade, road type, road loads, road curvature, etc.) received via one or more sensors, such as sensors 140. As described more fully herein, with this data, the controller 150 tracks vehicle road loads while in cruise control and may adjust a cruise control set speed to increase fuel efficiency based on the determined road loads.

As shown in FIG. 1, the powertrain system 110 includes an engine 111, a transmission 112, a drive shaft 113, a differential 114, and a final drive 115. As a brief overview, the engine 111 receives a chemical energy input (e.g., a fuel such as gasoline, diesel, etc.) and combusts the fuel to generate mechanical energy, in the form of a rotating crankshaft. The transmission 112 receives the rotating crankshaft and manipulates the speed of the crankshaft (to affect a desired drive shaft 113 speed. The rotating drive shaft 113 is received by a differential 114, which provides the rotation energy of the drive shaft 113 to the final drive 115. The final drive 115 then propels or moves the vehicle 100.

The engine 111 may be structured as any engine type: from an internal combustion engine to a full electric motor and combinations/variations in between (e.g., a hybrid drive comprising an internal combustion engine and an electric motor). According to the example embodiment, the engine 111 is structured as an internal combustion engine (e.g., compression-ignition, spark-ignition, etc.) that may be powered by any fuel type (e.g., diesel, ethanol, gasoline, etc.). Similarly, the transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission, etc.), the transmission can include a variety of settings (gears, for a geared transmission) that affect different output speeds based on the engine speed. Like the engine 111 and the transmission 112, the drive shaft 113, the differential 114, and the final drive 115 may be structured in any configuration dependent on the application (e.g., the final drive 115 is structured as wheels in an automotive application and a propeller in an airplane application, etc.). Further, the drive shaft 113 may be structured as any type of drive shaft including, but not limited to, a one-piece, two-piece, and a slip-in-tube driveshaft based on the application.

The vehicle 100 is also shown to include vehicle subsystems 120. The vehicle subsystems 120 may include both electrically-powered vehicle accessories and engine driven vehicle accessories, as well any other type of subsystem in the vehicle 100. For example, a subsystem may include an exhaust aftertreatment system. The exhaust aftertreatment system may include any component used to reduce exhaust emissions (e.g., diesel exhaust emissions, gas exhaust emissions, etc.), such as selective catalytic reduction catalyst, a diesel oxidation catalyst, a diesel particulate filter, a diesel exhaust fluid doser with a supply of diesel exhaust fluid, and a plurality of sensors for monitoring the aftertreatment system (e.g., a NOx sensor, etc.). The accessories may include, but are not limited to, air compressors (for pneumatic devices), air conditioning systems, power steering pumps, engine coolant pumps, fans, and the like.

The operator I/O device 130 enables an operator of the vehicle 100 (or another passenger) to communicate with the vehicle 100 and the controller 150. For example, the operator I/O device 130 may include, but is not limited, an interactive display, a touchscreen device, one or more buttons and switches, voice command receivers, etc. In this regard, the device 130 may be structured as solely an output device, where the signals, values, messages, information, etc. may only be provided to an operator or passenger of the vehicle; solely as input device, where an operator or passenger may provide information, signals, messages, etc. to the controller 150; and/or a combination therewith like shown in the example of FIG. 1. Via the operator I/O device 130, the user may input a desired operating characteristic including, but not limited to: minimize fuel consumption; minimize trip time; minimize power consumption; limit power output; and the like. In regard to a cruise control operating mode, the controller 150 may selectively adjust one or more cruise control characteristics to accommodate the inputted preference. This is explained more fully in regard to FIG. 2.

As the components of FIG. 1 are shown to be embodied in a vehicle 100, the controller 150 may be structured as an electronic control module (ECM). The ECM may include a transmission control unit and any other vehicle control unit (e.g., exhaust aftertreatment control unit, powertrain control module, engine control module, etc.). The function and structure of the controller 150 is described in greater detail in FIG. 2.

Figure 2:
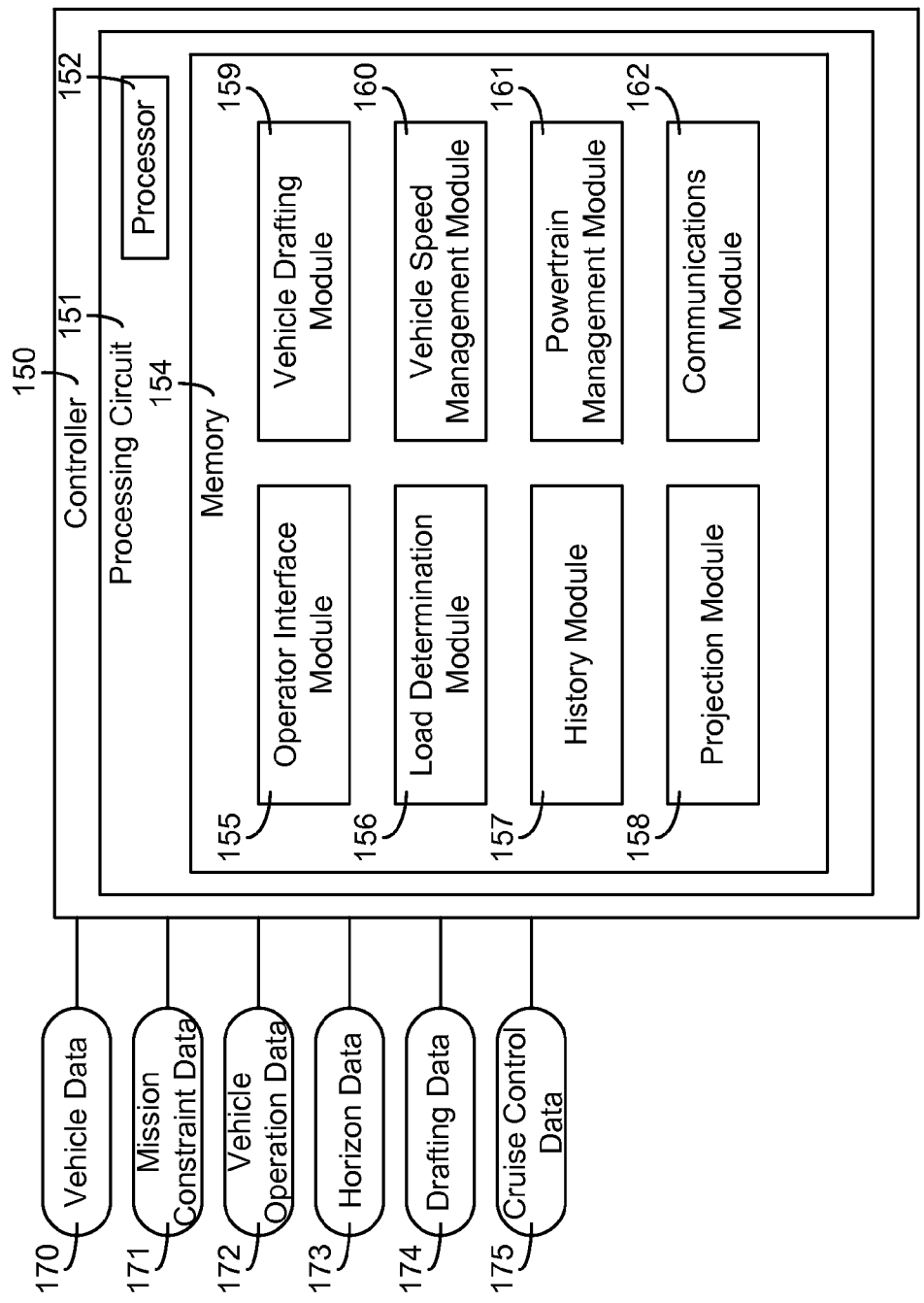
FIG. 2 is a schematic of the controller used with the system of FIG. 1, according to an example embodiment.

As such, referring now to FIG. 2, the function and structure of the controller 150 are shown according to one embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules configured to selectively adjust one or more cruise control parameters of a vehicle. While various modules with particular functionality are shown in FIG. 2, it should be understood that the controller 150 and memory 154 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 2, the controller 150 includes an operator interface module 155, a load determination module 156, a history module 157, a projection module 158, a vehicle drafting module 159, a vehicle speed management module 160, a powertrain management module 161, and a communications module 162. The operator interface module 155 may be communicably coupled to the operator I/O device 130 and is structured to receive one or more inputs from an operator, passenger, or other user in the vehicle 100. The input may include a cruise control set speed (e.g., a cruise control operating mode initiation, etc.). Adjustments to the set speed may also be received as an input. Similarly, the input may include a deactivation of cruise control. As an example, an operator may activate cruise control and input a cruise control set speed. The input may further include mission constraint data 171. The mission constraint data 171 may include a constraint and/or a preference of an operator regarding operation of the vehicle 100 such as operation based on a time constraint, a speed constraint, fuel efficiency, performance, a following distance, and the like. The operator preference may include, but is not limited to, a maximum following distance for a drafting arrangement between the vehicle 100 and a second vehicle, a minimum following distance for the drafting arrangement the vehicle 100 and a second vehicle, a maximum vehicle speed excursion (i.e., increase) relative to the cruise control set speed (e.g., 5 miles-per-hour (MPH), etc.), and/or a maximum vehicle speed reduction relative to the cruise control set speed (e.g., 2 MPH, etc.), among other possibilities. The maximum vehicle speed excursion/reduction may be parameters set by the operator or predefined within the controller 150 to limit the amount the cruise control set speed may deviate from the initially chosen cruise control set speed by the operator. In some embodiments, the operator preference may also include one or more target preferences, where the target preferences allows for a calibratable and predefined (e.g., five percent, etc.) amount of variation or deviation from the target value or range. For example, the target preference may include, but is not limited to, a target speed increase relative to the cruise control set speed, and a target following distance for the drafting arrangement. In an example, the target speed increase may be five miles-per-hour, with a tolerance band of plus-or-minus two miles-per-hour. Each target parameter may have its own predefined tolerance band associated with each target value. In this regard, the controller 150 takes into consideration that precise and exact parameter inputs may not always be feasible due to, e.g., environmental conditions. Further, by providing target ranges or values with tolerance bands, the controller 150 may dynamically adapt within or substantially within the constraints of the target ranges or values with tolerance bands to optimize facilitation and maintenance of a drafting arrangement.

Various vehicle data 170 may also be received via the operator interface module 155 and/or otherwise stored in the memory 154. The vehicle data 170 may be used by the load determination module 156 and may generally include a vehicle mass, vehicle aerodynamic coefficient, tire dynamic rolling resistance, tire static rolling resistance, tire circumference, radius or diameter, a lookup table for the a final drive torque loss, a lookup table for a transmission torque loss, and a lookup table for an engine torque loss. As may be discerned from the types of vehicle data 170 described above, the vehicle data 170 may be predefined in the controller 150 (e.g., vehicle mass) to take into consideration constants for the vehicle. As the controller 150 of the present disclosure may be used with other vehicles, an operator may simply download or select the vehicle (e.g., from a drop down menu) that will use the controller 150 to populate or receive the vehicle data 170 specific to that vehicle.

The load determination module 156 is structured to determine a current road load for the vehicle based at least partially on the vehicle data 170 and vehicle operation data 172 (described below) while the vehicle is in the cruise control operating mode. The current road load is the load that the engine/vehicle overcomes to maintain or substantially maintain the cruise control set speed. In some embodiments, the vehicle speed management module 160 implements adjustments to the cruise control set speed to accommodate for future road loads, as is described more fully herein. In other embodiments, the vehicle speed management module 160 substantially prevents adjustments that may adversely impact operability of the vehicle 100 and/or one or more of the operator's preferences (e.g., minimize fuel consumption, etc.).

To determine the current road load on the vehicle 100, the load determination module 156 may interpret vehicle operation data 172 acquired by one or more sensors in the vehicle 100, such as sensors 140. The sensors 140 may include, but are not limited to: engine speed sensors; vehicle speed sensors; engine torque sensors; vehicle mass sensors; road grade measurement sensors (e.g., an inclinometer); and the like. Accordingly, the vehicle operation data 172 includes data regarding a characteristic of the operation of the vehicle 100. The vehicle operation data 172 may include operation characteristics such as, but not limited to, an engine speed, a vehicle speed, an engine torque, an aerodynamic drag, component efficiencies (e.g., engine efficiency, transmission efficiency, etc.), a current road grade, etc. In certain embodiments, the load determination module 156 may use one or more of the following equations, along with the vehicle operation data 172 to determine the current road load. In doing so, the load determination module 156 may use the vehicle data 170 described above (e.g., vehicle mass, rolling resistance, etc.). The following equations are intended to show one example of a determination process for the current road load. In other embodiments, the current road load may be directly measured without the use of such equations (e.g., via a load sensor, etc.). All such variations and methods are intended to be within the scope and spirit of the present disclosure. The load determination module 156 is structured to transmit the current road load for the vehicle 100 to the vehicle speed management module 160.

Figure 3:
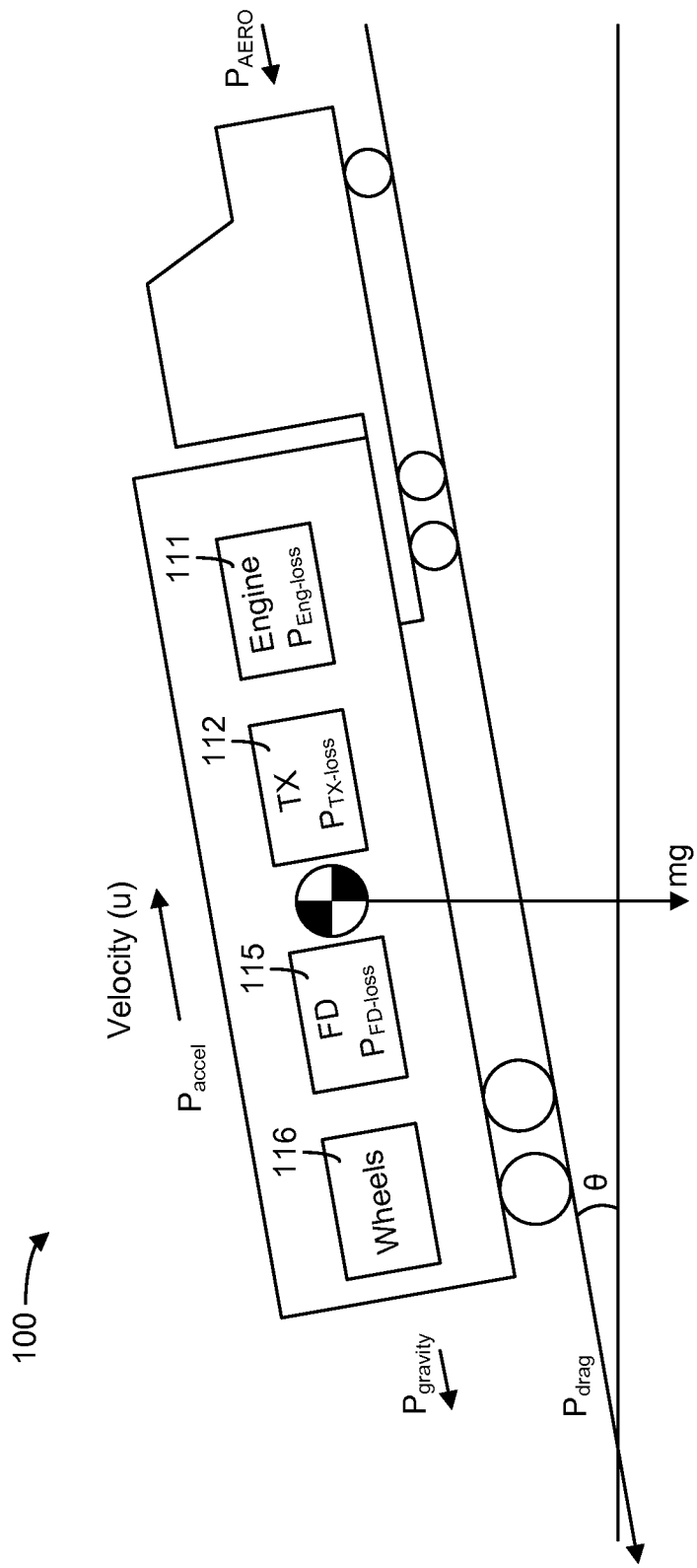
FIG. 3 is a schematic of a force diagram for a vehicle, according to an example embodiment.

Referring now to FIG. 3, a schematic of vehicle 100 is shown to indicate the power required to overcome various road loads associated with vehicle 100. FIG. 3 is used to show one example process of determining a current road load of the vehicle 100. Generally speaking, as shown, the vehicle 100 includes an engine 111, a transmission 112, a final drive 115, and wheels 116. The powers associated with vehicle 100 include $P_{Aero}$, the engine power required to overcome aerodynamic or wind resistance, $P_{Accel}$, which is the power required to accelerate vehicle 100, $P_{Drag}$, which is the power required to overcome the drag of wheels 116, and $P_{Gravity}$, which is the power required to overcome the force of gravity. Additionally, engine 111 also needs to overcome $P_{Eng-Loss}$, which is based on the efficiency of engine 111, $P_{TX-Loss}$, which is based on the efficiency of transmission 112, and $P_{FD-Loss}$, which is based on the efficiency of final drive 115. The power consumed for propelling a vehicle $P_{Road\ Load}$ is equivalent to the power from engine 111, $P_{Eng-Out}$, which may be determined from Equation (1).

$$P_{Road\ Load} = P_{Eng-Out} = P_{Aero} + P_{Drag} + P_{Gravity} + P_{Accel} + P_{Loss} \quad (1)$$

Each of these terms is calculated using inputs from a variety of locations, as mentioned above. Some of the values may be predefined in the controller 150 as vehicle data 170, as also described above. The power to overcome the aerodynamic drag or wind resistance of vehicle 100, $P_{Aero}$, may be calculated from Equation (2).

$$P_{Aero} = \left(\frac{A \cdot C_D \cdot \rho \cdot u^2}{2}\right) \cdot u \quad (2)$$

In Equation (2), $A \cdot C_D$ is the vehicle aerodynamic drag area (A) times the aerodynamic drag coefficient ($C_D$), which is a measure of aerodynamic resistance of a cross-sectional area. The term $\rho$ is the air density, and the term u is the velocity or speed of vehicle 100. The aerodynamic drag area may be predefined in the load determination module 156 and specific to each vehicle. Air density and velocity may be measured by a density sensor and a vehicle speed sensor.

The power required to overcome wheel drag, may be calculated using Equation (3).

$$P_{Drag} = [(C_{rr-dyn})(m \cdot g \cdot \cos \theta)(u) + (C_{rr-static})(m \cdot g \cdot \cos \theta)](u) \quad (3)$$

The term $C_{rr-dyn}$ is the wheel dynamic rolling resistance and the term $C_{rr-static}$ is the wheel static rolling resistance. Each of these terms may be predefined in load determination module 156. The term m is the mass of vehicle 100, the term g is the acceleration due to gravity, and the term $\theta$ is a road slope (i.e., road grade, etc.). While gravity may be a constant value, the mass of the vehicle 100 may be determined by a mass sensor or an external vehicle scale and then inputted via operator I/O device 130 to load determination module 156. Accordingly, if the vehicle is structured as a semi-tractor trailer, the mass may significantly change when the trailer is loaded and not loaded, which is now accounted for. In other embodiments, the vehicle mass may be assumed to be a constant value, such that fluctuations in vehicle mass (loaded versus unloaded semi-tractor trailer) are not taken into consideration. Equation (3) may be simplified to the form of Equation (4).

$$P_{Drag} = [(C_{rr-dyn})(u) + (C_{rr-static})](m \cdot g \cdot \cos \theta)(u) \quad (4)$$

The power required to overcome the force due to gravity may be found from Equation (5), which uses previously defined terms.

$$P_{Gravity} = (m \cdot g \cdot \sin \theta)(u) \quad (5)$$

The power required to accelerate the vehicle 100 consists of multiple components, including $P_{Veh-Accel}$, which is the power required to accelerate the vehicle alone, $P_{Whl-Accel}$, which is the power to accelerate the wheels 116, $P_{FD-Accel}$, which is the power required to accelerate the final drive 115, $P_{TX-Accel}$, which is the power required to accelerate the transmission 112, and $P_{Eng-Accel}$, which is the power to accelerate the engine 111. The power required to accelerate the vehicle 100 is shown in Equation (6).

$$P_{Accel} = P_{Veh-Accel} + P_{Whl-Accel} + P_{FD-Accel} + P_{TX-Accel} + P_{Eng-Accel} \quad (6)$$

The power required to accelerate the vehicle 100 may be found from the vehicle mass m, the vehicle acceleration a, and the vehicle velocity u, as shown in Equation (7).

$$P_{Veh-Accel} = m \cdot a \cdot u \quad (7)$$

The power required to accelerate the wheels 116 may be found from $I_{Whl}$, which is the inertia of the wheels 116, $\dot{\omega}_{Whl}$, which is the angular acceleration of the wheels 116, and $\omega_{Whl}$, which is the angular velocity of the wheels 116, as shown in Equation (8).

$$P_{Whl-Accel} = I_{Whl} \cdot \dot{\omega}_{Whl} \cdot \omega_{Whl} \quad (8)$$

The power required to accelerate the final drive 115 may be found from $I_{FD}$, which is the inertia of the final drive 115, $\dot{\omega}_{FD}$, which is the angular acceleration of the final drive 115, and $\omega_{FD}$, which is the angular velocity of the final drive 115, as shown in Equation (9).

$$P_{Whl-Accel} = I_{FD} \cdot \dot{\omega}_{FD} \cdot \omega_{FD} \quad (9)$$

The power required to accelerate the transmission 112 may be found from $I_{TX}$, which is the inertia of transmission 112, $\dot{\omega}_{TX}$, which is the angular acceleration of the transmission 112, and $\omega_{TX}$, which is the angular velocity of the transmission 112, as shown in Equation (10).

$$P_{TX-Accel} = I_{TX} \cdot \dot{\omega}_{TX} \cdot \omega_{TX} \quad (10)$$

The power required to accelerate the engine 111 may be found from $I_{Eng-Out}$, which is the inertia of the engine 111, $\dot{\omega}_{Eng-Out}$, which is the angular acceleration of the engine 111, and $\omega_{Eng-Out}$, which as mentioned above is the angular velocity of the engine 111, as shown in Equation (11).

$$P_{Eng-Accel} = I_{Eng-Out} \cdot \dot{\omega}_{Eng-Out} \cdot \omega_{Eng-Out} \quad (11)$$

To determine the inertias, the characteristics of each component (e.g., wheels, etc.) may be predefined in the load determination module 156. For example, an operator may specify the radius of the wheels 116 and the mass of such wheels 116 in order to determine the inertia. Each of the angular velocities and angular accelerations may be derived from data provided in the vehicle parameters in conjunction with the vehicle acceleration and velocity.

The final term, $P_{Loss}$, is a summary of the losses that need to be overcome by the vehicle 100. These losses may be summarized as in Equation (12).

$$P_{Loss} = P_{FD\text{-}Loss} + P_{TX\text{-}Loss} + P_{Eng\text{-}Loss} \qquad (12)$$

The loss from the final drive 115 may be calculated from $\Im(\omega_{FD\text{-}in} \cdot \tau_{FD\text{-}in})$ which may be found in a lookup table of the torque loss of the final drive 115, and $\omega_{FD\text{-}in}$, which is the angular velocity of the final drive 115 at the input, as shown in Equation (13).

$$P_{FD\text{-}Loss} = \Im(\omega_{FD\text{-}in} \cdot \tau_{FD\text{-}in}) \cdot \omega_{FD\text{-}in} \qquad (13)$$

The loss from the transmission 112 may be calculated from $\Im(\omega_{TX\text{-}in} \cdot \tau_{TX\text{-}in})$ which may be found in a lookup table of the torque loss of the transmission 112, and $\omega_{TX\text{-}in}$, which is the angular velocity of the transmission 112 at the input, as shown in Equation (14).

$$P_{TX\text{-}Loss} = \Im(\omega_{TX\text{-}in} \cdot \tau_{TX\text{-}in}) \cdot \omega_{TX\text{-}in} \qquad (14)$$

The loss from the engine 111 may be calculated from $\Im(\omega_{Eng\text{-}out})$, which is found in a lookup table of the torque loss of the engine 111, as shown in Equation (15).

$$P_{Eng\text{-}Loss} = \Im(\omega_{Eng\text{-}Out}) \cdot \omega_{Eng\text{-}Out} \qquad (15)$$

The power consumed in propelling the vehicle 100 may now be shown in terms of all the powers required, as shown in Equation (16).

$$\begin{aligned} P_{Road\ Load} = {} & P_{Aero} + P_{Drag} + P_{Gravity} + \\ & (P_{Veh\text{-}Accel} + P_{Whl\text{-}Accel} + P_{FD\text{-}Accel} + P_{Tx\text{-}Accel} + P_{Eng\text{-}Accel}) + \\ & (P_{FD\text{-}Loss} + P_{Tx\text{-}Loss} + P_{Eng\text{-}Loss}) \end{aligned} \qquad (16)$$

Even though $P_{Eng\text{-}Loss}$ is shown in Equation (16), it may be accounted for elsewhere, for example it may be integral to $P_{Eng\text{-}Out}$ and may not need to be explicitly included in Equation (16).

As mentioned above, the aforementioned equations, in connection with FIG. 3, illustrate one method of determining a current road load (e.g., $P_{Road\ Load}$). Other methods, processes, models, equations, algorithms, predictions, estimates, measurements, and the like may also be used by the load determination module 156, such that all such variations are intended to be within the spirit and scope of the present disclosure.

Moreover, in some embodiments, the values utilized in the above equations are measured/recorded from various vehicle sensors (e.g., the sensors 140, etc.). For example, the velocity of the vehicle may be measured by a speed sensor. In other embodiments, one or more of the variables above is estimated rather than measured/recorded. For example, over time, the coefficient of friction between the wheels and the road ($C_{rr\text{-}dyn}$ and $C_{rr\text{-}static}$) may decrease due to a decreasing amount of tired tread. Because a measurement may not be readily available, the load determination module 156 may estimate the coefficients of friction over time (e.g., use a look-up table for mileage versus friction coefficient for that specific tire, etc.). All such variations are intended to be within the scope of the present disclosure.

The load determination module 156 may be structured to continuously determine the current road load or, in certain embodiments, the determination may be made after a preset amount of time or distance. The preset amount of time or distance may be defined by a user via the operator I/O device 130. In this regard, transient or brief cruise control operating modes may be excluded from consideration.

According to an example embodiment, the projection module 158 includes a route management system. The route management system is a system structured to receive horizon data 173 regarding an attribute of a route of the vehicle 100 at a future or potential future location of the vehicle 100. The horizon data 173 may include data regarding a current road being traveled on and/or possible upcoming roads. For example, an operator may input a preferred destination into the route management system, which in turn may gather the horizon data 173 for the planned route. In another example, the route management system may receive the horizon data 173 as the vehicle travels along a road and a network of possible alternative roads (e.g., different routes, anticipating potential route changes, etc.). The horizon data 173 provided by the route management system may be based on GPS-based vehicle position and a digital map database. The horizon data 173 (e.g., route look-ahead data, electronic horizon, etc.) may include, but not limited to, a speed limit, a road grade (e.g., increase in road grade, decrease in road grade, etc.), a road curvature (e.g., a slight curve, a substantial curve, etc.), a road type (e.g., local, collector, arterial, highway, etc.), fuel station locations, a number of lanes, and the like. For example, the horizon data 173 may indicate a decrease in grade (e.g., a downhill slope, etc.) and/or an upcoming bend in a road. In one embodiment, the projection module 158 determines a future road load for the vehicle 100 based on horizon data 173. The projection module 158 is further structured to transmit the future road load to the vehicle speed management module 160.

Accordingly, the vehicle speed management module 160 is structured to receive and interpret the current road load and the future road load. In one embodiment, the vehicle speed management module 160 includes a cycle efficiency management (CEM) system. The CEM system is configured to optimize fuel economy over a drive cycle (e.g., a route of travel, etc.) using knowledge of current and upcoming environment conditions (e.g., current and future road loads, road attributes, etc.) to improve control of the powertrain system 110. For example, the CEM system may guide an operator to an appropriate vehicle speed, power target, and/or transmission gear selection to optimize vehicle speed, manage acceleration and available power, and/or intelligently make powertrain control decisions based on improved awareness of the environment (e.g., automatically, by providing a notification via the operator I/O device 130, etc.). The CEM system may also reduce operator variation (e.g., random accelerations, decelerations, etc.) and weigh vehicle performance versus fuel economy.

According to an example embodiment, the CEM system is used with a cruise control operating mode of the vehicle 100 (e.g., while cruise control is activated, etc.). The vehicle speed management module 160 may use the current and future road to adjust a cruise control set speed based on feedback provided by the CEM system to optimize fuel economy. In one embodiment, the adjustment of the cruise control set speed is based further on a preferred trip time. For example, the operator may input a desired time of arrival into the operator I/O device 130 such that the vehicle speed management module 160 has to optimize both fuel economy and performance (e.g., vehicle speed, etc.) to allow the vehicle 100 to arrive at the destination within the set time frame. In another embodiment, the adjustment of the cruise control set speed is based further on vehicle speed excursion levels. For example, the operator may input a maximum vehicle speed excursion/reduction in which the cruise control set speed is allowed to fluctuate between.

In an alternative embodiment, the current road load determined by the load determination module 156 is provided to the history module 157. The history module 157 is structured to track and maintain the road loads as the vehicle 100 travels along a route. In one configuration, the current road loads are tracked during a cruise control session to create a history of road loads. One cruise control session may correspond with a user activating and then, at some future time, deactivating cruise control. In another example, the cruise control session may permit a brief deactivation (e.g., thirty seconds, one-mile, etc.). For example, the operator may be travelling in cruise control and then apply the brakes of the vehicle to deactivate cruise control. The operator then re-activates cruise control within a predetermined time (or distance) frame. In this example, the history may correspond with the road loads determined prior to deactivation and after re-activation. In another example configuration, an operator may designate a route of the vehicle 100 via the operator I/O device 130. If the route has been previously travelled by the vehicle 100 (or some portion thereof), the history module 157 may recall the determined road loads for the route or portion thereof. In certain other embodiments, the history module 157 may maintain a history based on a cruise control set speed. For example, a user may designate a set speed of 55 MPH and, four minutes later, increase the set speed to 60 MPH. The history module 157 may determine a first set of road loads for the 4 minute 55 MPH period and a second set of road loads for the 60 MPH traveling period and demarcate the two sets. In this instance, the history module 157 recognizes the road load for substantially maintaining a vehicle at 55 MPH is likely different from that of 60 MPH. In each example configuration, a history of road loads is tracked and maintained during the cruise control operation mode.

Figure 4:
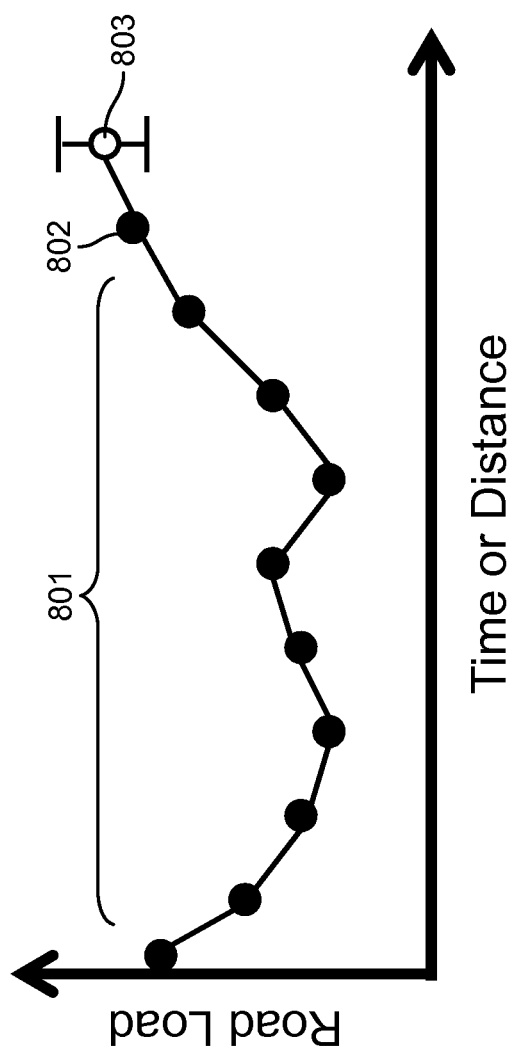
FIG. 4 is a graph depicting a projected future road load for a vehicle based on a history of road loads, according to an example embodiment

Accordingly, the projection module 158 is structured to project (e.g., predict, etc.) a future road load for the vehicle 100 based on the history of determined road loads. The projection may be based on a projected road load trend, a grade projection, and any other projection that provides an indication of the road load at a future location, time, or distance. Based on the history of determined road loads and the current road load, the projection module 158 may use an extrapolation function, a correlation function, a model, a forecasting application, an algorithm, and/or any other process to predict the road load at a future location or time. FIG. 4 depicts a history of determined road loads (portion 801), a current road load (802), and a predicted future road load (803). The predicted or projected future road load may be provided to the vehicle speed management module 160. Therefore, the projection module 158 enables the vehicle speed management module 160 to control the cruise control based on predicted future road loads without the use of technology that provides grade information (i.e., global positioning system data that provides altitude and curvature data, the route management system, etc.) to estimate the upcoming road load on the vehicle. In turn, the controller 150 includes a modularity aspect that may make it appealing to many vehicle operators.

The vehicle drafting module 159 is structured to determine a drafting road load for the vehicle based on drafting data 174 regarding operation between the vehicle 100 and a second vehicle. Drafting is the process of reducing aerodynamic loading (e.g., wind resistance, etc.) on a vehicle by following or leading another vehicle, thereby reducing the amount of power required to operate the engine 111 (e.g., $P_{Eng-out}$, $P_{Aero}$, etc.) to overcome the aerodynamic drag at a specified cruise control set speed. Fuel efficiency of the vehicle 100 may be increased by entering or maintaining a drafting arrangement (e.g., staying within a draft zone, etc.) when the vehicle 100 experiences a drafting arrangement/condition.

In one embodiment, the vehicle drafting module 159 includes a vehicle monitoring system. The vehicle monitoring system is structured to acquire the drafting data 174 regarding a drafting arrangement or a potential drafting arrangement between the vehicle 100 and another vehicle or group of vehicles (e.g., a cluster of vehicles may create a drafting arrangement for the vehicle). The vehicle drafting module 159 is structured to determine a drafting distance between the vehicle 100 and another vehicle (e.g., a leading vehicle, a following vehicle, a vehicle being passed, a passing vehicle, etc.). The drafting distance between the vehicle 100 and the second vehicle may be referred to as a draft zone herein. A draft zone is based on the second or other group of vehicles (e.g., smaller vehicles may have smaller drafting zones, etc.). Based on the relative speeds of the vehicles and size information regarding the other vehicles, a drafting zone between the vehicle 100 and the other vehicles may be determined by the vehicle drafting module 159. The controller 150 may then adjust the cruise control set speed of the vehicle 100 to stay within the determined draft zone when a determined drafting road load is less than a current road load (without drafting) and/or a future road load to facilitate an increase in fuel economy of the vehicle 100. In one embodiment, the draft zone is entered by an operator of the vehicle 100 to increase fuel efficiency, while still satisfying an operator defined preference (e.g., a maximum following distance for the drafting arrangement, a minimum following distance for the drafting arrangement, etc.). In other embodiments, a drafting arrangement between the vehicle 100 and another vehicle may be disregarded to satisfy operator defined constraints (e.g., speed constraints, time constraints, fuel efficiency constraints, a performance mode, etc.).

To determine a drafting condition of the vehicle 100, the vehicle drafting module 159 may interpret distance characteristics and size characteristics acquired by the vehicle monitoring system. The vehicle monitoring system may include one or more sensors, such as sensors 140, in order to acquire the distance characteristics and size characteristics and monitor the surrounding area around the vehicle 100. The vehicle monitoring system may include lidar, radar, ultrasound, and the like. In one embodiment, the sensors 140 include radar-based sensors configured to acquire the distance characteristics regarding a distance (e.g., forward distance, rearward distance, lateral distance, etc.) between the vehicle 100 and another vehicle. In some embodiments, the sensors 140 include ultrasonic sensors configured to acquire the distance characteristics, as well as the size characteristics including the type of another vehicle (e.g., small car, truck, motorcycle, etc.) in the proximity (e.g., front, rear, side, etc.) of the vehicle 100. The type of vehicle may affect the aerodynamic drag on the vehicle 100 due to different vehicles having different sizes (e.g., cross-sectional areas, etc.). As such, the draft zone may be determined based on the distance characteristics and size characteristics. The vehicle drafting module 159 may determine an effective aerodynamic coefficient of drag (e.g., a reduced drag coefficient due to a drafting condition, etc.) by mapping the acquired data (e.g., size characteristics, distance characteristics, etc.) of another vehicle (e.g., a leading vehicle, a following vehicle, etc.). Therefore, the vehicle drafting module 159 may determine an effective aerodynamic drag on the vehicle 100 when driving within a draft zone (e.g., via fluid mechanics models, look-up tables, algorithms, etc.). The effective aerodynamic drag may facilitate the determination of a drafting road load on the vehicle 100. The vehicle drafting data 174 may also include a cruise control set speed prior to drafting, a type of vehicle (e.g., a truck, a car, etc.), wind conditions/speed, a distance between two vehicles (e.g., a leading vehicle and a following vehicle, etc.), aerodynamic drag, an optimal draft zone, and the like. The vehicle drafting module 159 is further structured to determine a drafting road load based on the drafting data 174. The vehicle drafting module 159 may transmit the vehicle drafting data 174 and the determined drafting road load to the vehicle speed management module 160. The vehicle speed management module 160 interprets the vehicle drafting data 174 to affect an appropriate cruise control set speed to maintain a drafting distance (e.g., determined by the vehicle drafting module 159, etc.) between the vehicle 100 and another vehicle. In other embodiments, the vehicle speed management module 160 provides a vehicle speed adjustment to an output device of the vehicle (e.g., I/O device 130) for an operator to implement the vehicle speed adjustment to at least one of facilitate and maintain a drafting arrangement. The vehicle speed management module 160 may be structured to reduce fuel consumption of the vehicle 100 over a mission by interpreting the vehicle operation data 172, the horizon data 173, and the drafting data 174 to determine which of the current road load, the future road load, and the drafting road load indicate a smaller load on the vehicle 100.

Figure 5:
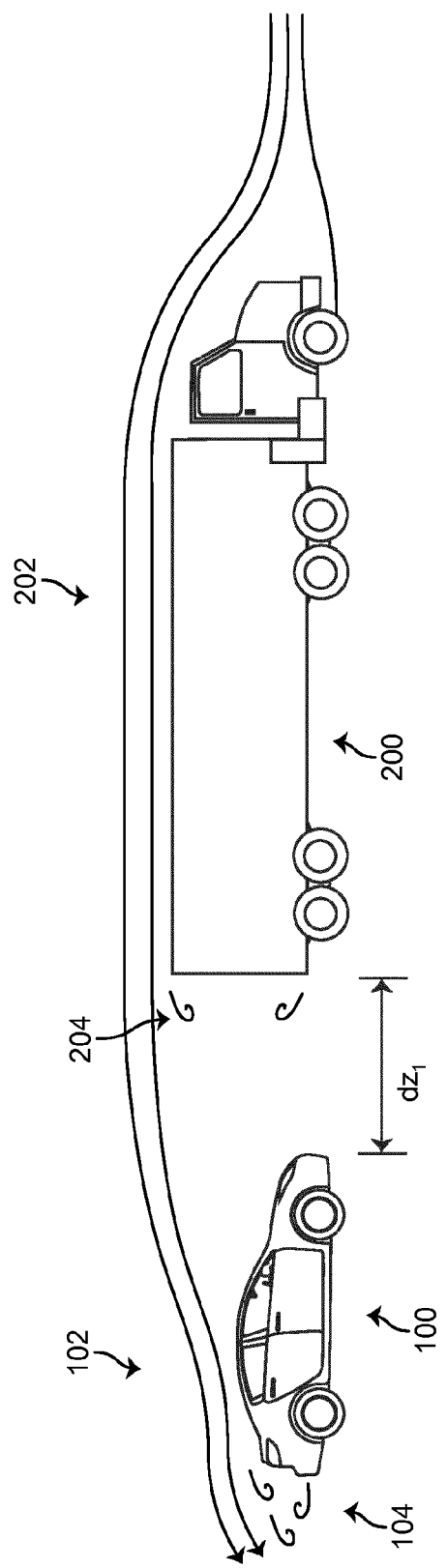
FIG. 5 is an illustration of a drafting arrangement for a vehicle following another vehicle, according to an example embodiment.
Figure 6:
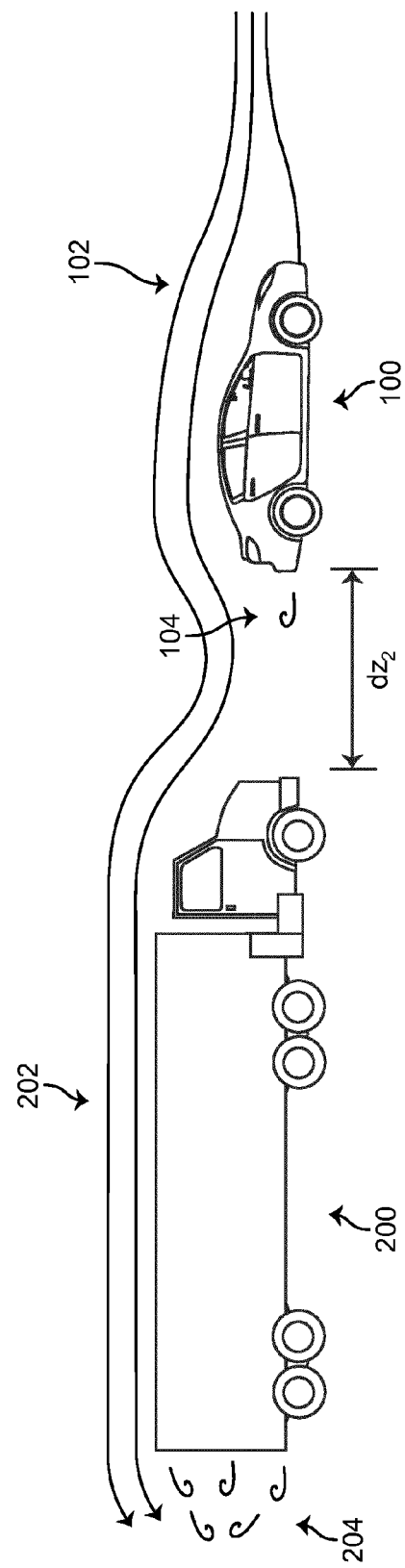
FIG. 6 is an illustration of a drafting arrangement for a vehicle leading another vehicle, according to an example embodiment.
Figure 7:
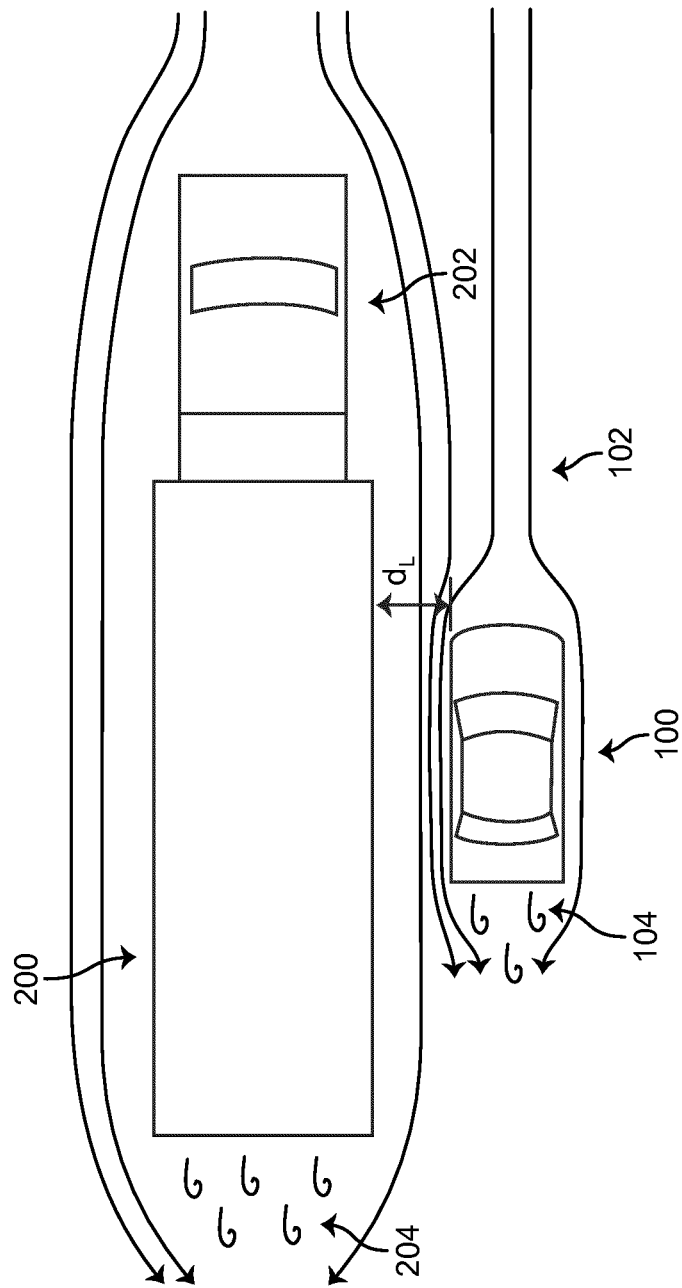
FIG. 7 is an illustration of a drafting arrangement for a vehicle passing another vehicle, according to an example embodiment.

Referring now to FIGS. 5-7, various drafting conditions are shown according to several example embodiments. As shown in FIG. 5-7, the vehicle 100 and a second vehicle, shown as vehicle 200, create streamlines 102 and 202 that flow about the vehicles 100 and 200 as each is moving, respectively. As the streamlines 102 and 202 reach the rear of the vehicles 100 and 200, the streamlines 102 and 202 begin to shed (e.g., causing turbulent flow at the rear of the vehicles, etc.), causing vortex shedding, shown as vortex shedding 104 and 204, respectively. Vortex shedding may increase the aerodynamic drag on a vehicle. As a brief overview, the controller 150 interprets the vehicle drafting data 174 received from the vehicle monitoring system (e.g., distance and/or speed sensors around a vehicle, etc.) to determine a drafting condition (e.g., draft distance, draft zone, etc.) to reduce aerodynamic drag on the vehicle 100, thereby facilitating an increase in fuel economy (or substantially preventing a decrease in fuel economy).

As shown in FIG. 5, the vehicle 100 is following the second vehicle 200. The vehicle drafting module 159 is structured to determine a following draft zone $dz_1$ based on the vehicle drafting data 174. As shown in FIG. 5, the draft zone $dz_1$ is defined by the distance from the rear of the leading vehicle (e.g., the vehicle 200, etc.) to the front of the following vehicle (e.g., the vehicle 100, etc.). The vortex shedding 204 of the vehicle 200 is substantially minimized when the vehicle 100 follows the vehicle 200 within the draft zone $dz_1$, thereby substantially decreasing the aerodynamic drag on the vehicle 100 (and the vehicle 200). The decrease in aerodynamic drag may substantially increase the fuel efficiency of the vehicle 100 as the vehicle 100 follows the vehicle 200. As such, the vehicle speed management module 160 may adjust the cruise set speed of the vehicle 100 to maintain the drafting arrangement within the draft zone $dz_1$ (e.g., based on the vehicle drafting data 174, etc.). Or, if a cruise control operating mode has not been initiated, the vehicle speed management module 160 may provide an indication to, e.g., increase the vehicle speed to maintain the drafting arrangement within the draft zone $dz_1$.

As shown in FIG. 6, the vehicle 100 is leading the vehicle 200. The vehicle drafting module 159 is structured to determine a leading draft zone $dz_2$ based on the vehicle drafting data 174. As shown in FIG. 6, the draft zone $dz_2$ is defined by the distance from the rear of the leading vehicle (e.g., the vehicle 100, etc.) to the front of the following vehicle (e.g., the vehicle 200, etc.). The vortex shedding 104 of the vehicle 100 is substantially minimized when the vehicle 100 leads the vehicle 200 within the draft zone $dz_2$, thereby substantially decreasing the aerodynamic drag on the vehicle 100 (and the vehicle 200). The decrease in aerodynamic drag may substantially increase the fuel efficiency of the vehicle 100 as the vehicle 100 leads the vehicle 200. As such, the vehicle speed management module 160 may adjust the cruise set speed of the vehicle 100 to maintain the drafting arrangement within the draft zone $dz_2$ (e.g., based on the vehicle drafting data 174, etc.). Or, as described above, the vehicle speed management module 160 may provide an indication to at least one of increase and decrease the vehicle speed to an operator (e.g., via the I/O device 130) to facilitate and/or maintain the drafting arrangement.

As shown in FIG. 7, the vehicle 100 is in a position lateral to the vehicle 200 (e.g., on the side of, etc.). For example, the vehicle 100 may be passing the vehicle 200 or the vehicle 100 may be getting passed by the vehicle 200. As a result of the vehicle 100 being on the side of the vehicle 200, the vehicle 100 may experience aerodynamic drag from wind resistance (e.g., represented by the streamlines 102, etc.) and the vortex shedding 104, as well as from the streamlines 202 flowing around the vehicle 200, increasing the overall aerodynamic drag on the vehicle 100. The increased aerodynamic drag may cause the engine 111 of the vehicle 100 to output a greater amount of power (e.g., $P_{Eng-out}$, etc.) to overcome the aerodynamic drag, thereby reducing the fuel efficiency. In this case, the vehicle speed management module 160 may adjust (e.g., increase, decrease, etc.) the cruise set speed of the vehicle 100. In one embodiment, a time-constraint may be implemented such that the vehicle 100 needs to arrive at a predefined destination by a certain time. In this event, the vehicle speed management module 160 may be predisposed to favor performance over fuel efficiency. The vehicle speed management module 160 may increase the cruise control set speed of the vehicle 100 to either pass the vehicle 200 and establish a leading draft zone $dz_2$ (e.g., determined by the vehicle drafting module 159, etc.) (see, e.g., FIG. 6) or maintain a speed above that of the vehicle 200 such that once the vehicle 100 passes the vehicle 200, and a distance between the two vehicles continually increases. In another embodiment, a minimum or maximum vehicle speed excursion level may be specified. In this event, the vehicle speed management module 160 may be predisposed to favor fuel efficiency over performance. The vehicle speed management module 160 may decrease the cruise control set speed of the vehicle 100 to either let the vehicle 200 pass and establish a following draft zone $dz_1$ (e.g., determined by the vehicle drafting module 159, etc.) (see, e.g., FIG. 5) or maintain a speed below that of the vehicle 200 such that the vehicle 200 passes by the vehicle 100.

Referring still to FIG. 7, in an alternative embodiment, the vehicle drafting module 159 interprets the vehicle drafting data 174 to determine a lateral distance $d_L$ between the vehicle 100 and the vehicle 200 that reduces aerodynamic drag on the vehicle 100. The vehicle drafting module 159 may determine that the aerodynamic drag on the vehicle 100 may be reduced by moving laterally towards the vehicle 200 (e.g., decreasing $d_L$, etc.) or laterally away from the vehicle 200 (e.g., increasing $d_L$, etc.). For example, the controller 150 may communicate to an operator of the vehicle 100 via the operator I/O device 130 that aerodynamic drag may be decreased (i.e., fuel efficiency may be increased, etc.) by moving laterally towards the vehicle 200. The operator may choose to implement or decline the suggested lateral movement. In one embodiment, an operator may set a lateral distance threshold (e.g., 2 feet, 3 feet, etc.) via the operator I/O device 130 such that the vehicle drafting module 159 does not determine/suggest a lateral distance substantially close to another vehicle (e.g., the vehicle 200, etc.). In another example, the controller 150 may communicate to an operator of the vehicle 100 via the operator I/O device 130 that aerodynamic drag may be decreased (i.e., fuel efficiency may be increased, etc.) by moving laterally away from the vehicle 200 (e.g., move over in the current lane, switch to an adjacent lane, etc.). Again, the operator may choose to implement or decline the suggested lateral movement. In one embodiment, the lateral movement is implemented manually by the operator via a steering wheel or other steering mechanism. In another embodiment, the controller 150 may automatically control the lateral movement of the vehicle (e.g., via an actuator, motor, etc.). In some embodiments, the vehicle drafting module 159 may determine that the aerodynamic drag on the vehicle 100 is further reduced by implementing lateral movement and movement relative to the position of the vehicle 100 along the vehicle 200 (e.g., towards the front of the vehicle 200, towards the rear of vehicle 200, etc.). For example, the vehicle speed management module 160 may adjust the cruise control set speed to bring the vehicle 100 closer to the front end of the vehicle 200 before, after, or during the implementation of the lateral movement.

According to an example embodiment, the vehicle speed management module 160 is structured to reduce fuel consumption over a mission by selectively adjust the cruise control set speed of the vehicle 100 based on receiving/interpreting at least one of the current road load determined by load determination module, the future road load determined by the projection module 158, and the drafting road load determined by the vehicle drafting module 159. According to the present disclosure, a more fuel efficient solution may be generated by the vehicle speed management module 160 by factoring in the relationship between changing the cruise control set speed based on road attributes (e.g., both current and upcoming, etc.) and maintaining a drafting distance to remain in a draft zone.

The a vehicle speed management module 160 is structured to selectively adjust the cruise control set speed of the vehicle 100 to at least one of facilitate and maintain a drafting arrangement between the vehicle 100 and the second vehicle 200 responsive to at least one of the current road load, the future road load, and the drafting road load. In some embodiments, the vehicle speed management module 160 is further structured to adjust the cruise control set speed to comply with one or more of the aforementioned operator preferences. According to an example embodiment, the vehicle speed management module 160 is structured to adjust the cruise control set speed to facilitate at least one of entering and maintaining a drafting arrangement based on the drafting road load indicating that the drafting road load is less than at least one of the current road load and the future road load.

In one embodiment, the vehicle speed management module 160 may determine that it is more fuel efficient to speed up on a downgrade (e.g., down-hills, negative grade, etc.) to enter and/or maintain a drafting arrangement with another vehicle rather than coasting (e.g., providing no power to the wheels, switching the transmission 112 to neutral, etc.) while on the downgrade. For example, the vehicle speed management module 160 may adjust the cruise control set speed higher than the cruise control set speed within the maximum vehicle speed excursion (i.e., not higher than the maximum vehicle speed excursion, etc.) such that the vehicle speeds up on a downhill to facilitate at least one of entering and maintaining the drafting arrangement based on the drafting road load being less than at least one of the current road load and the future road load on the downhill.

In another embodiment, the vehicle speed management module 160 may determine that it is more fuel efficient to slow down prior to an incline (e.g., up-hills, positive grade, etc.) to enter into and/or maintain a drafting arrangement with another vehicle rather than speeding up (e.g., accelerating, etc.) prior to the incline to gain momentum to traverse the incline. For example, the vehicle speed management module 160 may adjust the cruise control set speed lower than the cruise control set speed within the minimum vehicle speed excursion (i.e., not lower than the minimum vehicle speed excursion, etc.) such that the vehicle 100 slows down on or prior to an uphill to facilitate at least one of entering and maintaining a drafting arrangement based on the drafting road load being less than at least one of the current road load and the future road load on the uphill. According to another example embodiment, the vehicle speed management module 160 is structured to adjust the cruise control set speed to facilitate the exiting of the vehicle 100 from the drafting arrangement or notify an operator via the operator I/O device 130 not to enter the drafting arrangement based on at least one of the current road load and the future road load being less than the drafting road load.

In other embodiments, the vehicle speed management module 160 adjusts the cruise control set speed based on either the current road load and the future road load or the current road load and the drafting road load. For example, if another vehicle isn't present when the vehicle 100 is traveling over a hill, the vehicle speed management module 160 may adjust the cruise control set speed based off of the current and future road loads to optimize the fuel efficiency of the vehicle 100. However, the adjustment of the cruise control set speed by the vehicle speed management module 160 may be subject to an operator preference to stay within a designated speed range (e.g., maximum vehicle speed excursion, minimum vehicle speed excursion, etc.). In another example, on a substantially flat road where the vehicle 100 encounters another vehicle, the vehicle speed management module 160 may adjust the cruise control set speed based off of the current road load and the drafting road load to optimize fuel efficiency of the vehicle 100. The vehicle speed management module 160 may be structured to adjust the cruise control set speed to facilitate at least one of entering and maintaining a drafting arrangement between the vehicle 100 and another vehicle based on the drafting road load indicating that the drafting road load is less than that of the current road load (and/or a future road load).

At any point in which the vehicle 100 may encounter a current or a future road load less than the drafting road load, the vehicle speed management module 160 may be structured to adjust the cruise control set speed to facilitate an exit of the vehicle 100 from the drafting arrangement and/or notify an operator to not enter the drafting arrangement based on at least one of the current road load and the future road load being less than the drafting road load. Also, the adjustment of the cruise control set speed by the vehicle speed management module 160 may be subject to an operator preference to stay within a time constraint such that the vehicle speed management module 160 maintains a cruise control set speed that may not facilitate a drafting arrangement with another vehicle (e.g., if the other vehicle is traveling at a speed that may not facilitate the arrival of the vehicle 100 within the designated time constraint, etc.). In any case, the controller 150 is structured to optimize the fuel efficiency of the vehicle 100 based on the predefined constraints (e.g., mission constraint data 171, operator preferences, etc.) and driving conditions (e.g., current road load, future road load, drafting road load, etc.).

It should be understood that in other embodiments, the vehicle speed management module 160 may be utilized independent of the cruise control operating mode for the vehicle. Thus, while the description above and below is mainly in regard to adjustments made during a cruise control operating mode, this description is not meant to be limiting as the same or similar principles, processes, methods, strategies, and the like may be utilized during non-cruise control operating modes as well. For example and as described above, the vehicle speed management module 160 may provide a vehicle speed adjustment to an operator of the vehicle to facilitate a drafting arrangement independent of whether the vehicle is in a cruise control operating mode or not. For example, drafting data may indicate that a nearby second vehicle would provide a drafting arrangement if the vehicle accelerated to be within or substantially within the drafting zone of the second vehicle. In response, the vehicle speed management module 160 may provide an acceleration notification or message via the I/O device 130 to the operator for the operator to choose or not to choose to take advantage of the relatively lower load condition via the drafting arrangement. In another example, the operator may have provided a preference of, e.g., to decrease fuel consumption. In response, the vehicle speed management module 160 may utilize a cost function (e.g., using fuel consumption as a variable and various other variables a predefined maximum/minimum vehicle speed deviation relative to a posted speed limit, optimize fuel consumption to a minimum value) to determine the vehicle speed adjustment needed or likely needed to achieve or likely achieve the best or likely the best fuel consumption. In this instance, the determination may be independent of the drafting road load relative to the future and/or current road loads. However, in other embodiments, the preference may be utilized in combination with the drafting, future, and/or current road loads in a relatively more complex cost function to achieve or substantially achieve a desired characteristic of one or more preferences.

The powertrain management module 161 is structured to provide commands to selectively control one or more components in the powertrain system 110. The powertrain management module 161 is also structured to receive and interpret cruise control data 179. The cruise control data 179 may include a notification (e.g., a signal, etc.) that cruise control has been activated/deactivated via the operator I/O device 130, an operator selected cruise control set speed, an adjusted cruise control set speed from the vehicle speed management module 160, and the like. The powertrain management module 161 manages the fueling, torque, engine speed, transmission setting, and any other component to achieve or substantially achieve the cruise control set speed (e.g., set by an operator, adjusted by vehicle speed management module 160, etc.).

In some embodiments, the controller 150 includes the communications module 162. The communications module 162 is structured to communicate with at least one of another vehicle (e.g., via short-range to medium-range wireless communication, etc.) and an external network or central server or database (e.g., a fleet manager, a traffic center, global positioning systems, etc.) to establish an intelligent transportation system (ITS). The communications module 162 may send and/or receive data regarding the vehicle 100, other vehicles, traffic conditions, road conditions, and the like. The communications module 162 may provide an operator with real-time travel and traffic information via the operator I/O device 130, such as transit routes and schedules, navigation directions, and information about delays due to congestion, accidents, weather conditions, road repair work, etc. In some embodiments, the communications module 162 is able to inform an operator of vehicle 100 in real-time of his/her precise location, inform him/her of current traffic or road conditions on a current and/or surrounding roadways, and empower him/her with optimal route selection and navigation instructions. In this regard, the data provided by the communications module 162 is dynamic in that it approximates substantially real-time driving conditions (e.g., an upcoming crash that necessitates a disengagement of the drafting arrangement, etc.)

The communications module 162 may receive information/data regarding one or more other vehicles. The communication between the vehicles may be vehicle-to-vehicle or vehicle-to-server-to-vehicle. The vehicle-to-vehicle communication may be performed via any suitable short to medium range wireless communications protocol (e.g., Wi-Fi, infrared, radio, RFID, near-field communications (NFC), Bluetooth, etc.). The vehicle-to-server-to-vehicle communication may be performed via any suitable long range wireless communications protocol. The data regarding the other vehicle(s) may include, but not limited to, a current speed of the other vehicle, a current location of the other vehicle, a type of the other vehicle, and the like. The current speed of the other vehicle may include an absolute speed of the other vehicle or a relative speed of the other vehicle in relation to the vehicle 100. The current location of the other vehicle may include an absolute location of the vehicle (e.g., GPS coordinates, etc.) or a relative distance of the other vehicle in relation to the vehicle 100. The type of the other vehicle may include a make (e.g., Ford, Chevy, BMW, Freightliner, etc.), a model (e.g., F-150, Impala, M4, etc.), a body style (e.g., truck, van, sedan, coupe, compact, semi-truck, etc.), and any other information that may indicate size characteristics of the other vehicle (e.g., cross-sectional area, width, height, length of the other vehicle, etc.). The vehicle drafting module 159 may receive the data regarding the other vehicle to determine the drafting road load for the vehicle 100 based on the operation and characteristics of the other vehicle. In turn, the vehicle speed management module 160 may selectively adjust the cruise control set speed of the vehicle 100 to at least one of facilitate, maintain, and exit a drafting arrangement between the vehicle 100 and the other vehicle based on the operation and characteristics of the other vehicle.

Figure 8:
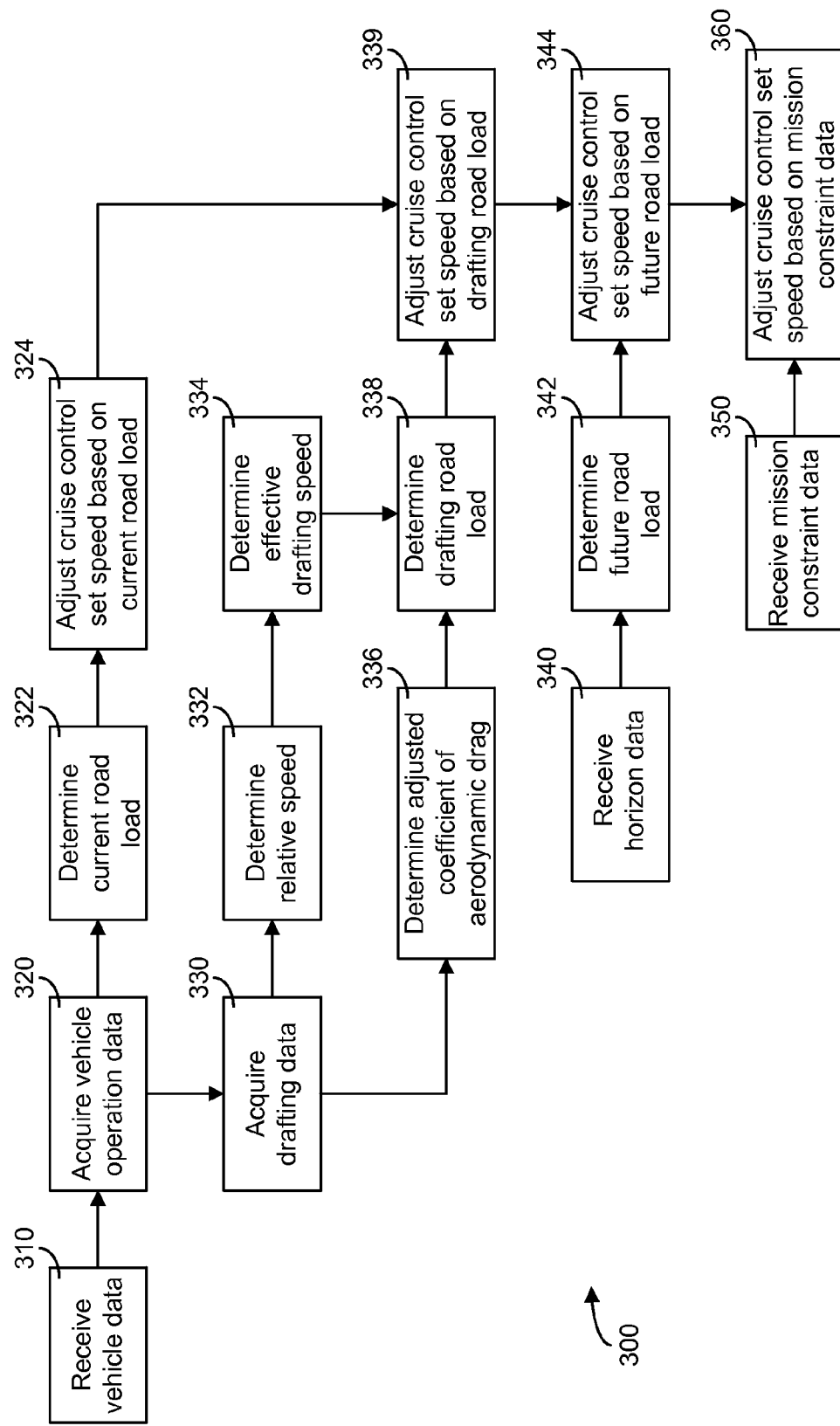
FIG. 8 is a method of controlling a cruise control set speed, according to an example embodiment.

Referring now to FIG. 8, a method 300 of dynamically controlling a cruise control set speed is shown according to an example embodiment. Method 300 corresponds with the controller 150 interpreting vehicle data 170, mission constraint data 171, vehicle operation data 172, horizon data 173, and vehicle drafting data 174 to affect a cruise control set speed. In one example embodiment, method 300 may be implemented with the controller 150 of FIGS. 1-2. Accordingly, method 300 may be described in regard to FIGS. 1-2.

At process 310, the controller 150 receives vehicle data 170. As described above, the vehicle data 170 may be inputted via the operator I/O device 130 to the operator interface module 155 and may include data indicative of characteristics of the vehicle 100 such as vehicle mass, coefficient of aerodynamic drag, tire rolling resistance, etc. At process 320, the controller 150 acquires vehicle operation data 172. The vehicle operation data 172 may be acquired via the sensors 140, look-up tables, algorithms, or any other suitable method. As described above, the vehicle operation data 172 may include, but not limited to, an engine speed, a vehicle speed, an engine torque, an aerodynamic drag, and component efficiencies. At process 322, the controller 150 determines a current road load. In one embodiment, the load determination module 156 implements Equations (1)-(16) along with the vehicle operation data 172 and vehicle data 170 to determine the current road load. In other embodiments, the load determination module 156 determines the current road load via look-up tables, sensors 140, or still otherwise determined. As described above, the current road load may include aerodynamic loads (e.g., wind resistance, aerodynamic drag, etc.), drag loads (e.g., rolling resistance, friction, etc.), gravitational loads (e.g., power to overcome gravitational forces, etc.), acceleration loads (e.g., power to accelerate engine, transmission, etc.), and component power loses (e.g., transmission losses, engine loses, etc.). At process 324, the controller 150 adjusts the cruise control set speed based on the current road load. For example, an operator may input a desired cruise control set speed via the operator I/O device 130. Based on the current road load and predefined preferences (e.g., a fuel efficiency mode, a performance mode, etc.), the controller 150 may either increase or decrease the cruise control set speed when the vehicle 100 encounters various road loads (e.g., gusts of wind, water on the road, a dirt road, etc.) to substantially maintain the cruise control set speed despite the changing load on the vehicle.

At process 330, the controller 150 acquires vehicle drafting data 174. The vehicle drafting data 174 may be acquired via sensors 140 (e.g., lidar, radar, ultrasonic sensors, etc.) and may include at least one of distance characteristics and size characteristics regarding another vehicle (e.g., ahead of, behind, or lateral to the vehicle 100, etc.), as described above. The vehicle drafting module 159 interprets the vehicle drafting data 174 to determine a draft zone when a drafting arrangement (e.g., approaching another vehicle, being approached by another vehicle, etc.) is experienced by the vehicle 100. At process 332, the controller 150 determines the relative speed between two vehicles (e.g., the vehicle 100 and the vehicle 200, etc.). In one embodiment, the vehicle drafting module 159 uses the distance characteristics and the speed of the vehicle 100 (e.g., from the vehicle operation data 172, etc.) to determine the relative speed between the vehicle 100 and 200. For example, using a differentiation algorithm, the relative speed is determined using the speed of the vehicle 100 and the rate of change in the distance between the vehicles 100 and 200. In another embodiment, the vehicle 100 includes a speed sensor configured to acquire the relative speed between two vehicles. At process 334, the controller 150 determines an effective drafting speed. The effective drafting speed is a speed at which the vehicle 100 needs to be traveling to stay within the determined draft zone (e.g., drafting distance from another vehicle, etc.). At process 336, the controller 150 determines an adjusted coefficient of aerodynamic drag based on the size characteristics, and thereby determines a drafting road load based on an effective aerodynamic drag (process 338). For example, during a drafting event, the effective aerodynamic drag is dependent on the type and size of vehicle the vehicle 100 is drafting (e.g., following, leading, passing, etc.). Thus, the vehicle drafting module 159 determines the adjusted coefficient of aerodynamic drag (e.g., if the vehicle 100 were to travel within the draft zone, etc.) based on the size characteristics of the second vehicle. In turn, the vehicle drafting module 159 determines the effective aerodynamic drag based on the adjusted coefficient of aerodynamic drag, thereby determining the drafting road load (e.g., aerodynamic load, etc.) of process 322 based on the effective aerodynamic drag. At process 339, the controller 150 adjusts the cruise control set speed based further on the vehicle drafting data 174 and the drafting road load. For example, if the vehicle speed management module 160 determines that fuel efficiency may be increased by entering into a drafting event (i.e., increasing fuel efficiency by reducing aerodynamic drag, etc.), the vehicle speed management module 160 adjusts the cruise control set speed to the effective draft speed determined during process 334 such that the vehicle 100 enters into and/or remains within the determined draft zone.

At process 340, the controller 150 receives horizon data 173. As described above, the route management system of the projection module 158 receives horizon data 173 regarding road attributes at a future location such as road grade, road curvature, road type, etc. At process 342, the controller 150 determines a future road load based on the horizon data 173. For example, an increase in grade may directly affect the power required to overcome the gravitational forces on the vehicle 100. At process 344, the controller 150 adjusts the cruise control set speed based further on the horizon data 173 and the future road load. For example, if a grade increase lies ahead, the vehicle speed management module 160 may increase the cruise control set speed to substantially prevent sudden accelerations (e.g., due to increased gravitational loads, etc.) when the road grade changes, thereby increasing fuel efficiency over the route. In one embodiment, the operator is notified that a drafting arrangement must be exited to facilitate the change in the cruise control set speed based on the future road load. In other embodiments, the controller 150 ignores the future road load to remain in the drafting arrangement based on the drafting road load indicating a load on the vehicle 100 less than the future road load.

At process 350, the controller 150 receives mission constraint data 171. The mission constraint data 171 may be inputted to the operator interface module via the operator I/O device 130. As described above, the mission constraint data 171 may include a cruise control operating mode for the vehicle 100 such as operation based on a time constraint, a speed constraint, fuel efficiency, and/or performance. At process 360, the controller 150 adjusts the cruise control set speed based further on the mission constraint data 171. As such, the vehicle speed management module 160 may weigh fuel economy versus performance in order to satisfy a given constraint (e.g., predefined time of arrival, minimum or maximum vehicle speed, etc.).

As described in regards to method 300, the controller 150 adjusts the cruise control set speed based on the road load responsive to the vehicle drafting data 174 and the horizon data 173, the vehicle operation data 172, and the mission constraint data 171. In other embodiments, the controller 150 adjusts the cruise control set speed based on at least one of the vehicle operation data 172, the vehicle drafting data 174, the horizon data 173, and the mission constraint data 171. Thereby, the cruise control set speed may be based on any combination of the foregoing data. In another embodiment, the controller 150 adjusts the cruise control set speed based on additional or other factors/data. The order in which the controller 150 acquires the foregoing data shown in FIG. 8 is an example representation and should not be limiting. The order may be changed, processes omitted, and/or additional processes added.

According to an example embodiment, the controller 150 interprets the foregoing data to optimize the fuel efficiency of the vehicle 100. Therefore, the controller 150 may choose to favor certain data over other data in some situations. For example, when the vehicle 100 approaches a grade decrease (e.g., decline, down-hill, etc.) without a drafting condition present (e.g., no other vehicles, etc.), the controller 150 may decide to gradually decrease the cruise control set speed or shift the transmission 112 into a neutral configuration prior to reaching or when encountering the decline. By doing so, the vehicle 100 allows gravity to provide the power required to move the vehicle 100, rather than provide engine power, to increase the fuel efficiency of the vehicle 100. Conversely, when the vehicle 100 approaches a grade decrease with a drafting condition present (e.g., following another vehicle, leading another vehicle, etc.), the controller 150 may counterintuitively increase the cruise control set speed to enter and/or maintain the drafting arrangement (e.g., if the other vehicle is speeding up, if the other vehicle is at a distance where drafting is currently not occurring, etc.), thereby reducing the aerodynamic drag on the vehicle 100 and increasing the fuel efficiency.

Referring now to FIG. 9A, a method 400a of dynamically controlling a cruise control set speed is shown according to another embodiment. Method 400a corresponds with the controller 150 interpreting vehicle data 170, mission constraint data 171, vehicle operation data 172, horizon data 173, and vehicle drafting data 174 to affect a cruise control set speed. In one example embodiment, method 400a may be implemented with the controller 150 of FIGS. 1-2. Accordingly, method 400a may be described in regard to FIGS. 1-2.

At process 410, the controller 150 receives vehicle data 170. At process 420, the controller 150 acquires vehicle operation data 172. At process 422, the controller 150 determines a current road load. At process 430, the controller 150 receives horizon data 173. At process 440, the controller 150 receives mission constraint data 171. At process 450, the controller 150 determines a projected cruise control set speed based on the horizon data 173 and mission constraint data 171, as well as the current performance of the vehicle 100 (e.g., the vehicle operation data 172, etc.). At process 450, the controller 150 determines the projected cruise control set speed such that fuel efficiency maximization is achieved as the road attributes change, while staying within the set constraints of the mission (e.g., time, speed, etc.). At process 452, the controller 150 determines the future road load based on the projected cruise control set speed and the projected road attributes.

At process 460, the controller 150 acquires vehicle drafting data 174. At process 462, the controller 150 determines the relative speed between two vehicles (e.g., the vehicle 100 and the vehicle 200, etc.). At process 464, the controller 150 determines an effective drafting speed. The Effective drafting speed may be a range and refers to a speed of the vehicle to maintain or substantially maintain the vehicle within the drafting zone. In one embodiment, the effect drafting speed range is any vehicle speed that corresponds with a drafting road load at or below the current or future road load for the vehicle outside of the drafting zone. Due to the effects of wind and other drafting conditions, the speeds within the effective drafting speed range may correspond with different road loads.

At process 466, the controller 150 determines an adjusted coefficient of aerodynamic drag, thereby determining an effective aerodynamic drag on the vehicle 100. At process 470, the controller determines the drafting road load on the vehicle based on the effective aerodynamic drag and the effective drafting speed. At process 480, the controller 150 determines a cruise control set speed. The controller 150 compares the future road load from process 452 and the drafting road load from process 470 and determines which provides the lowest road load on the vehicle 100, thereby providing the optimal fuel efficiency during a mission (e.g., a trip, a drive, etc.). For example, the vehicle 100 may be approaching an incline and may have the possibility of entering into a drafting event with another vehicle. The controller 150 may weigh the possible options: focus on drafting, focus on the mission constraints, focus on road attributes, or any combination of the foregoing options. The option chosen by the controller 150 may be based on predefined preferences such as a fuel efficiency mode or a performance mode, among other alternatives.

According to one embodiment, the controller 150 is structured to select a vehicle speed set speed within the effective drafting speed range that corresponds with a minimum determined drafting road load. By consistently choosing the lowest road load, the controller 150 is structured to substantially always work to reduce the drag forces that must be overcome by the vehicle to substantially maintain a desired speed (e.g., a cruise control set speed). Due to reducing the aerodynamic loading (i.e., the drafting road load, etc.), fuel economy also increases. According to another embodiment, the speed adjustment may be based on one or more other mission constrain data 171 (or preference data) of the operator. For example, the operator may have inputted a desire to minimize trip time. Accordingly, the controller 150 is structured to increase the speed of the vehicle, potentially above an upper limit of the effective drafting speed range such that the drafting arrangement may need to be exited to facilitate a relatively quicker travel time.

Referring now to FIG. 9B, a method 400b of dynamically controlling a cruise control set speed is shown according to still another embodiment. Method 400b corresponds with the method 400a to re-map mission constraints based on gained or lost time. In one example embodiment, method 400b may be implemented with the controller 150 of FIGS. 1-2. Accordingly, method 400b may be described in regard to FIGS. 1-2.

As described above in regards to the method 400a, the controller 150 determines cruise control set speed at process 470. At process 480, the controller 150 determines a change in the trip time. For example, the cruise control set speed may be adjusted lower than initially projected to increase fuel efficiency, thereby increasing the trip time. In one embodiment, the controller 150 notifies the operator (e.g., via operator I/O device 130, etc.) that the trip time may change. The operator may choose to either accept or decline the change in the cruise control set speed affecting the trip time. In other embodiments, the controller automatically implements the adjustment to the cruise control set speed based on predefined constraints/preferences (e.g., fuel efficiency, performance, etc.). At process 490, the controller 150 re-maps the mission constraints. The controller 150 readjusts the projected arrival time based on the change in the cruise control set speed. For example, the vehicle 100 may travel at a speed greater than initially projected, thereby decreasing the trip time.

It should be understood that while methods 300, 400*a*, and 400*b* are described in regard to adjustment of a cruise control operating point, as described above, the methods 300, 400*a*, and 400*b* may be implemented independent of a cruise control operating mode as described above. This other implementation embodiment may provide for a relatively greater applicability of the systems, methods, and apparatuses of the present disclosure to facilitate additional beneficial characteristics of the present disclosure, such is the ability to constantly use the systems, methods, and apparatuses described herein without limitation or substantially without limitation regardless of the operating mode of the vehicle (e.g., cruise control, normal operator-controlled, etc.). Accordingly, the systems, methods, and apparatuses of the present disclosure are meant to be broadly interpreted.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
 a history module structured to track a history of road loads based on cruise control operation of a vehicle, a designated route, or a combination thereof;
 a projection module structured to determine a future road load for the vehicle based on horizon data at a future location of the vehicle and the history of road loads;
 a vehicle drafting module structured to determine a drafting road load for the vehicle based on drafting data regarding operation of a second vehicle; and
 a vehicle speed management module structured to determine and provide a vehicle speed adjustment to an output device of the vehicle to at least one of facilitate and maintain a drafting arrangement between the vehicle and the second vehicle responsive to at least one of the future road load and the drafting road load.

2. The apparatus of claim 1, further comprising an operator interface module structured to receive an input of an operator of the vehicle, wherein the input includes a preference of the operator, wherein the vehicle speed adjustment is structured to comply with the preference.

3. The apparatus of claim 2, wherein the preference includes at least one member selected from a group consisting of a maximum following distance for the drafting arrangement, a minimum following distance for the drafting arrangement, a maximum vehicle speed reduction relative to a cruise control set speed, a maximum vehicle speed increase relative to the cruise control set speed, a target vehicle speed reduction, relative to the cruise control set speed, a target speed increase relative to the cruise control set speed, and a target following distance for the drafting arrangement.

4. The apparatus of claim 3, wherein in response to initiation of a cruise control operating mode, the vehicle speed management module is structured to reduce the cruise control set speed subject to the maximum vehicle speed reduction such that the vehicle slows down on an uphill grade based on the drafting road load being less than the future road load on the uphill grade.

5. The apparatus of claim 3, wherein in response to initiation of a cruise control operating mode, the vehicle speed management module is structured to increase the cruise control set speed subject to the maximum vehicle speed increase such that the vehicle speeds up on a downhill grade based on the drafting road load being less than the future road load on the downhill grade.

6. The apparatus of claim 3, wherein the vehicle speed adjustment is based on a utilization of a cost function by the vehicle speed management module with respect to the preference, wherein the vehicle speed adjustment is independent of a relationship between the future road load and the drafting road load.

7. The apparatus of claim 1, wherein the vehicle speed adjustment is structured to facilitate at least one of entering into and maintaining the drafting arrangement based on the drafting road load indicating that the drafting road load is less than the future road load.

8. The apparatus of claim 1, wherein the vehicle speed adjustment is structured to at least one of facilitate an exit of the vehicle from the drafting arrangement and to notify an operator via the output device to not enter the drafting arrangement based on the future road load being less than the drafting road load.

9. The apparatus of claim 1, further comprising a communications module structured to establish an intelligent transportation system via communications with at least one of an external network and the second vehicle to acquire dynamic data regarding at least one of operation of the second vehicle and another vehicle, wherein the dynamic data regarding operation of the at least one second vehicle and the another vehicle includes at least one of a speed, a location, a type, and a size of the second vehicle and the another vehicle.

10. A method, comprising:
 tracking, by a controller, a history of road load data based on cruise control operation of a vehicle, a designated route, or a combination thereof;
 receiving, by the controller, horizon data regarding a future location of the vehicle;
 determining, by the controller, a future road load based on the horizon data and the history of the road load data;
 receiving, by the controller, drafting data regarding operation of a second vehicle;

determining, by the controller, a drafting road load for the vehicle based on the drafting data; and selectively providing, by the controller, a vehicle speed adjustment to an output device of the vehicle to at least one of facilitate and maintain a drafting arrangement between the vehicle and the second vehicle responsive to at least one of the future road load and the drafting road load.

11. The method of claim 10, further comprising receiving, by the controller, a preference of an operator, wherein the vehicle speed adjustment is structured to comply with the preference independent of a relationship between the future road load and the drafting road load.

12. The method of claim 11, wherein the preference includes at least one of a maximum following distance for the drafting arrangement, a minimum following distance for the drafting arrangement, a maximum vehicle speed reduction relative to a cruise control set speed, and a maximum vehicle speed excursion relative to the cruise control set speed, a target speed increase relative to the cruise control set speed, and a target following distance for the drafting arrangement.

13. The method of claim 10, further comprising:

receiving, by the controller, an indication of an initiation of a cruise control operating mode for a vehicle and a cruise control set speed; and reducing, by the controller, the cruise control set speed subject to a maximum vehicle speed reduction such that the vehicle slows down on an uphill grade based on the drafting road load being less than the future road load on the uphill grade.

14. The method of claim 13, further comprising increasing, by the controller, the cruise control set speed subject to a maximum vehicle speed excursion such that the vehicle speeds up on a downhill grade based on the drafting road load being less than the future road load on the downhill grade.

15. The method of claim 10, wherein the vehicle speed adjustment is structured to facilitate at least one of an entering and a maintaining of the drafting arrangement based on the drafting road load indicating that the drafting road load is less than the future road load.

16. The method of claim 10, wherein the vehicle speed adjustment is structured to at least one of facilitate an exit of the vehicle from the drafting arrangement and to notify an operator to not enter the drafting arrangement via the output device based on the future road load being less than the drafting road load.

17. A vehicle, comprising:

a vehicle monitoring system structured to acquire drafting data regarding a drafting arrangement between the vehicle and a second vehicle;

a route management system structured to receive horizon data regarding a future location of the vehicle; and a controller communicably coupled to the vehicle monitoring system and the route management system, the controller structured to:

track a history of road loads based on cruise control operation of the vehicle, a designated route, or a combination thereof;

determine a future road load based on the horizon data and the history of road loads;

determine a drafting road load based on the drafting data; and provide a vehicle speed adjustment to an output device of the vehicle to at least one of facilitate and maintain a drafting arrangement between the vehicle and the second vehicle responsive to at least one of the future road load and the drafting road load.

18. The vehicle of claim 17, wherein the controller is structured to receive an input, the input including a cruise control operating mode initiation and a cruise control set speed for the vehicle.

19. The vehicle of claim 18, wherein the input further includes at least one of a maximum following distance for the drafting arrangement, a minimum following distance for the drafting arrangement, a maximum vehicle speed reduction relative to the cruise control set speed, and a maximum vehicle speed excursion relative to the cruise control set speed.

20. The vehicle of claim 19, wherein the controller is structured to adjust the cruise control set speed to at least one of facilitate and maintain the drafting arrangement.

21. The vehicle of claim 17, wherein the controller is structured to reduce fuel consumption over a mission by interpreting vehicle operation data, the horizon data, and the drafting data.

22. The vehicle of claim 21, wherein the vehicle speed adjustment is structured to facilitate at least one of an entering and a maintaining of the drafting arrangement based on the drafting road load indicating that the drafting road load is less than the future road load.

23. The vehicle of claim 21, wherein the vehicle speed adjustment is structured to at least one of facilitate an exit of the vehicle from the drafting arrangement and notify an operator to not enter the drafting arrangement based on the future road load being less than the drafting road load.

* * * * *